United States Patent
Jung et al.

(10) Patent No.: US 7,934,260 B2
(45) Date of Patent: *Apr. 26, 2011

(54) VIRUS IMMUNIZATION USING ENTITY-SPONSORED BYPASS NETWORK

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US); Lowell L. Wood, Jr., Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1091 days.

This patent is subject to a terminal disclaimer.

(21) Appl. No.: 11/513,901

(22) Filed: Aug. 30, 2006

(65) Prior Publication Data

US 2007/0271615 A1    Nov. 22, 2007

Related U.S. Application Data

(63) Continuation-in-part of application No. 11/492,691, filed on Jul. 24, 2006, and a continuation-in-part of application No. 11/492,689, filed on Jul. 24, 2006, and a continuation-in-part of application No. 11/474,523, filed on Jun. 22, 2006, and a continuation-in-part of application No. 11/413,969, filed on Apr. 27, 2006.

(51) Int. Cl.
*H04L 29/14*    (2006.01)
(52) U.S. Cl. .......................................... 726/24
(58) Field of Classification Search .......................... None
See application file for complete search history.

(56) References Cited

U.S. PATENT DOCUMENTS

| | | | |
|---|---|---|---|
| 5,987,610 | A | 11/1999 | Franczek et al. |
| 6,081,894 | A | 6/2000 | Mann |
| 6,311,277 | B1 | 10/2001 | Takaragi et al. |
| 6,374,303 | B1 | 4/2002 | Armitage et al. |
| 6,732,279 | B2 | 5/2004 | Hoffman |
| 6,851,057 | B1 | 2/2005 | Nachenberg |
| 7,010,696 | B1 | 3/2006 | Cambridge et al. |
| 7,020,150 | B2 | 3/2006 | Ho et al. |
| 7,093,293 | B1 | 8/2006 | Smithson et al. |
| 7,571,483 | B1 | 8/2009 | Bascle et al. |
| 7,647,411 | B1 | 1/2010 | Schiavone et al. |
| 2002/0161918 | A1 | 10/2002 | Asano et al. |
| 2002/0174358 | A1 | 11/2002 | Wolff et al. |
| 2004/0015718 | A1 | 1/2004 | DeClouet |
| 2004/0073701 | A1 | 4/2004 | Huang et al. |
| 2004/0088564 | A1 | 5/2004 | Norman |
| 2004/0098482 | A1 | 5/2004 | Asano |
| 2005/0022028 | A1 | 1/2005 | Hall |

(Continued)

OTHER PUBLICATIONS

PCT International Search Report; International App. No. PCT/US07/14564; Mar. 26, 2008; pp. 1-2.

(Continued)

*Primary Examiner* — Minh Dinh
(74) *Attorney, Agent, or Firm* — Margaret M. Anderson

(57) ABSTRACT

An apparatus, device, method, computer program product, and system are described that in some instances may provide access to at least one bypass network, provide distribution of an anti-viral agent onto a communications network associated with a virus, using the at least one bypass network, and provide an entity-sponsored assurance of a transmission characteristic of the at least one bypass network with respect to the providing the distribution.

44 Claims, 13 Drawing Sheets

U.S. PATENT DOCUMENTS

| | | |
|---|---|---|
| 2005/0050378 A1 | 3/2005 | Liang |
| 2005/0086499 A1 | 4/2005 | Hoefelmeyer et al. |
| 2005/0120231 A1 | 6/2005 | Harada et al. |
| 2005/0182949 A1 | 8/2005 | Phillips et al. |
| 2005/0198519 A1 | 9/2005 | Tamura et al. |
| 2005/0204150 A1 | 9/2005 | Peikari |
| 2005/0288961 A1 | 12/2005 | Tabrizi |
| 2005/0289649 A1 | 12/2005 | Mitomo et al. |
| 2006/0031940 A1 | 2/2006 | Rozman et al. |
| 2006/0048228 A1 | 3/2006 | Takemori et al. |
| 2006/0072527 A1 | 4/2006 | Beck et al. |
| 2006/0095961 A1 | 5/2006 | Govindarajan et al. |
| 2006/0095965 A1 | 5/2006 | Phillips et al. |
| 2006/0190606 A1 | 8/2006 | Kohavi |
| 2006/0218635 A1 | 9/2006 | Kramer et al. |
| 2007/0002838 A1 | 1/2007 | Komura et al. |
| 2007/0101430 A1 | 5/2007 | Raikar |
| 2007/0250931 A1 | 10/2007 | Takahashi |
| 2007/0294759 A1 | 12/2007 | Browne |
| 2008/0005784 A1 | 1/2008 | Miliefsky |

OTHER PUBLICATIONS

PCT International Search Report; International App. No. PCT/US07/10140; May 8, 2008; pp. 1-2.

PCT International Search Report; International App. No. PCT/US07/14579; Jun. 20, 2008; pp. 1-2.

Bontchev, Vesselin; "Are 'Good' Computer Viruses Still a Bad Idea?"; pp. 1-29; University of Hamburg; located at: http://vx.netlus.ort/lib/avb02.html; printed on: Mar. 1, 2006.

"Cisco—MPLS FAQ For Beginners"; Bearing dates of 1992-2006 and May 8, 2006; pp. 1-7; Cisco Systems, Inc.; printed on May 21, 2006; located at: http://www.cisco.com/warp/public/105/mpls_faq_4649.shtml.

Goel, Sanjay and Bush, Stephen F.; "Biological Models of Security for Virus Propagation in Computer Networks"; pp. 1-7; located at: http://www.albany.edu/—goel/publications/goellogin12004.pdf.

Goldenberg et al.; "Distributive immunization of networks against viruses using the 'honey-pot' architecture"; Bearing a date of Dec. 1, 2005; pp. 1-5; Nature Physics.

Somayaji et al.; "Principles of a Computer Immune System"; Department of Computer Science, University of New Mexico; Bearing dates of 1997 & 1998; pp. 75-82; New Security Paradigms Workshop; located at: http://www.cs.unm.edu/~immsec/publications/nspw-97.pdf.

"Trillium—Multiprotocol Label Switching (MPLS)"; Web ProForum Tutorials; pp. 1-24; The International Engineering Consortium; located at: http://www.iec.org , Jun. 2000.

Wang et al.; "On Computer Viral Infection and the Effect of Immunization"; pp. 1-11; Department of Computer Science, University of Virginia; located at: http://csdl2.computer.org/persagen/DLAbsToc.jsp?resourcePath=/dl/proceedings/&toc=comp/proceedings/acsac/2000/0859/00/0859toc.xml&DOI0.1109/ACSAC.2000.898879.

Chinese Patent Office official action; App. No. 200780015273.1 based on PCT/US07/010140; Aug. 24, 2010 (received [*by our agent*] on Sep. 10, 2010); pp. 1-6. (No Translation Currently Available).

Start

510
Providing access to at least one bypass network

520
Providing distribution of an anti-viral agent onto a communications network associated with a virus, using the at least one bypass network 530
Providing an entity-sponsored assurance of a transmission characteristic of the at least one bypass network with respect to the providing the distribution End

VIRUS IMMUNIZATION USING ENTITY-SPONSORED BYPASS NETWORK

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements referenced below, the present application constitutes a continuation in part of currently co-pending United States patent application entitled Multi-Network Virus Immunization, naming Edward K. Y. Jung, Royce A. Levien, Robert W. Lord, Mark A. Malamud, John D. Rinaldo, Jr., and Lowell L. Wood, Jr., as inventors, U.S. application Ser. No. 11/413,969, filed Apr. 27, 2006.

2. For purposes of the USPTO extra-statutory requirements referenced below, the present application constitutes a continuation in part of currently co-pending United States patent application entitled Virus Immunization Using Prioritized Routing, naming Edward K. Y. Jung, Royce A. Levien, Robert W. Lord, Mark A. Malamud, John D. Rinaldo, Jr., and Lowell L. Wood, Jr., as inventors, U.S. application Ser. No. 11/474,523, filed Jun. 22, 2006.

3. For purposes of the USPTO extra-statutory requirements referenced below, the present application constitutes a continuation in part of currently co-pending United States patent application entitled Multi-Network Virus Immunization With Separate Physical Path, naming Edward K. Y. Jung, Royce A. Levien, Robert W. Lord, Mark A. Malamud, John D. Rinaldo, Jr., and Lowell L. Wood, Jr., as inventors, U.S. application Ser. No. 11/492,689, filed Jul. 24, 2006.

4. For purposes of the USPTO extra-statutory requirements referenced below, the present application constitutes a continuation in part of currently co-pending United States patent application entitled Multi-Network Virus Immunization With Trust Aspects, naming Edward K. Y. Jung, Royce A. Levien, Robert W. Lord, Mark A. Malamud, John D. Rinaldo, Jr., and Lowell L. Wood, Jr., as inventors, U.S. application Ser. No. 11/492,691, filed Jul. 24, 2006.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent that such subject matter is not inconsistent herewith.

SUMMARY

An embodiment provides a method. In one implementation, the method includes but is not limited to providing access to at least one bypass network, providing distribution of an anti-viral agent onto a communications network associated with a virus, using the at least one bypass network, and providing an entity-sponsored assurance of a transmission characteristic of the at least one bypass network with respect to the providing the distribution. In addition to the foregoing, other method aspects are described in the claims, drawings, and text forming a part of the present disclosure.

An embodiment provides a computer program product. In one implementation, the computer program product includes but is not limited to a signal-bearing medium bearing one or more instructions for providing access to at least one bypass network, one or more instructions for providing distribution of an anti-viral agent onto a communications network associated with a virus, using the at least one bypass network, and one or more instructions for providing an entity-sponsored assurance of a transmission characteristic of the at least one bypass network with respect to the providing the distribution. In addition to the foregoing, other computer program product aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

An embodiment provides a device. In one implementation, the device includes but is not limited to an entity-sponsored virus immunization system, and the entity-sponsored virus immunization system includes but is not limited to access logic operable to provide access to at least one bypass network, and distribution logic operable to provide distribution of an anti-viral agent onto a communications network associated with a virus, using the at least one bypass network, the distribution logic being further operable to provide an entity-sponsored assurance of a transmission characteristic of the at least one bypass network with respect to the providing the distribution. In addition to the foregoing, other device aspects are described in the claims, drawings, and text forming a part of the present disclosure.

An embodiment provides a system. In one implementation, the system includes but is not limited to a computing device and one or more instructions. The instructions when executed on the computing device cause the computing device to provide access to at least one bypass network, provide distribution of an anti-viral agent onto a communications network associated with a virus, using the at least one bypass network, and provide an entity-sponsored assurance of a transmission characteristic of the at least one bypass network with respect to the providing the distribution. In addition to the foregoing, other system aspects are described in the claims, drawings, and text forming a part of the present disclosure.

In addition to the foregoing, various other embodiments are set forth and described in the text (e.g., claims and/or detailed description) and/or drawings of the present description.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices and/or processes described herein, as defined by the claims, will become apparent in the detailed description set forth herein.

BRIEF DESCRIPTION OF THE DRAWINGS

FIG. 5 illustrates an operational flow representing example operations related to techniques for virus immunization using an entity-sponsored bypass network.

The use of the same symbols in different drawings typically indicates similar or identical items.

DETAILED DESCRIPTION

Figure 1:
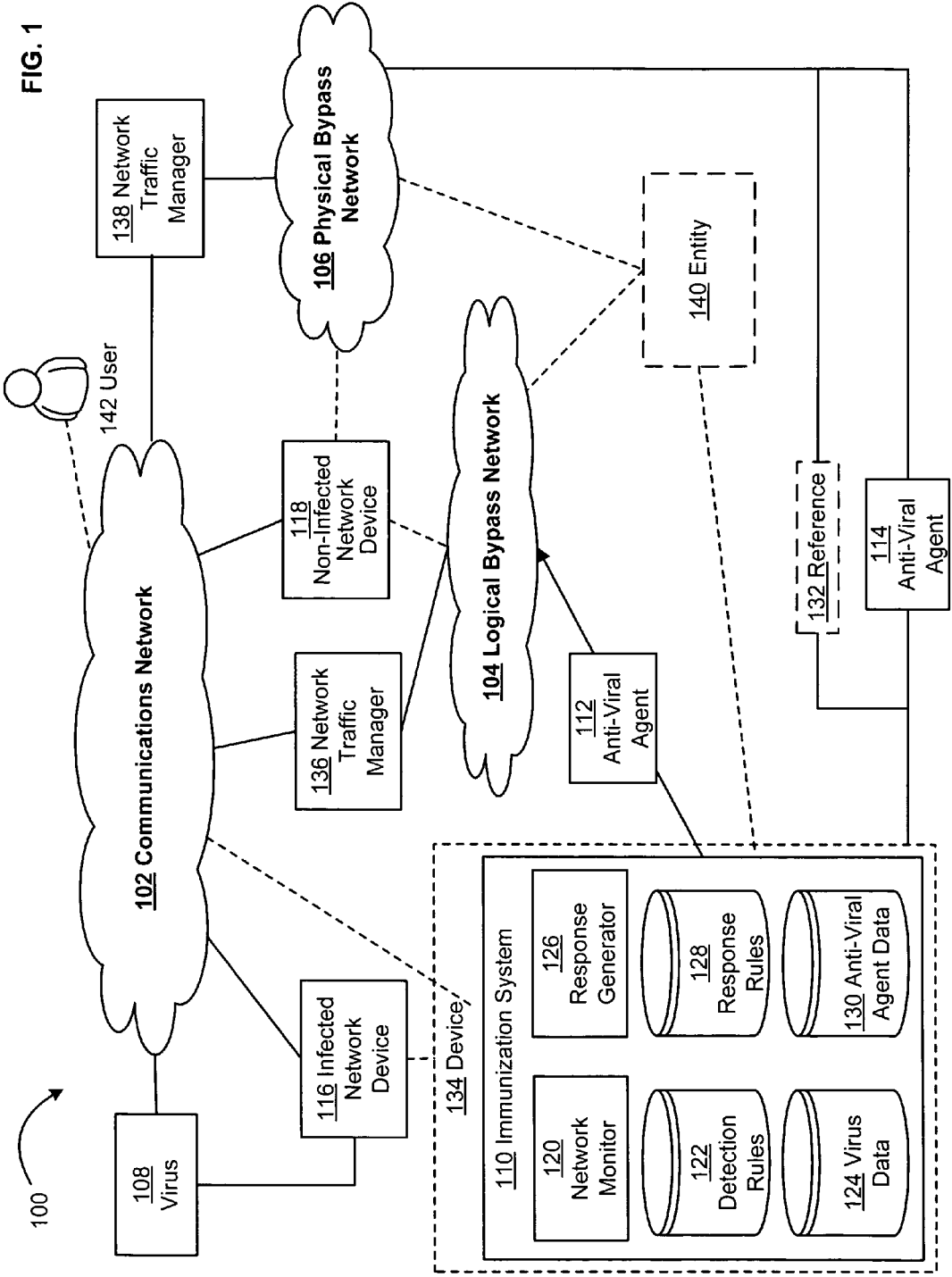
FIG. 1 illustrates an example multi-network virus immunization system in which embodiments may be implemented, perhaps in a device.

FIG. 1 illustrates an example multi-network virus immunization system 100 in which embodiments may be implemented. In the example of FIG. 1, the multi-network virus immunization system 100 is operable, for example, to prevent or reduce damage caused by malicious software code, or otherwise limit a propagation and/or replication of any undesired code or behavior within a computer network. For example, the multi-network virus immunization system 100 may be operable to limit propagation/replication of undesired code within a first network by initiating a competing and inherently-advantaged propagation/replication of desired code, using a second network.

In the example of FIG. 1, an example of such a first network is illustrated as a communications network 102. The communications network 102 may include, for example, virtually any computer network over which users and/or network devices may conduct a mutually-desirable exchange of information, where such mutually-desirable information may include and/or be referred to as communications data. For example, such communications data may include voice or e-mail traffic that is desired by both a sending and a receiving party, or may include a file transfer (including, for example, a video and/or audio file transfer) desired by both a sending and a receiving party. The communications network 102 may include, for example, a virtual local area network, a virtual private network (VPN), and/or a corporate intranet, and, in such examples, may be implemented as part of (e.g., as a subset of) a larger network, such as, for example, the public Internet. Other examples of the communications network 102 and of communications data are provided in more detail, herein.

Further in the example of FIG. 1, an example of the second network referenced above as part of the multi-network virus immunization system 100 may include a logical bypass network 104 and/or a physical bypass network 106, and/or other example(s) of a bypass network(s), as described in more detail, herein. For example, the logical bypass network 104 may include a computer network that is at least partially logically separate from the communications network 102 (e.g., at least one or more segments of the logical bypass network 104 may be logically separate from the communications network 102). For example, the communications network 102 and the logical bypass network 104 may both be implemented on an identical set (or sub-set(s)) of computing devices that are physically connected to one another, but that implement different network protocols, or that implement different instances of the same or similar network protocols, or that are implemented at different layers of a protocol stack, or are otherwise logically-separated from one another.

For instance, a computer that is common to both the communications network 102 and the logical bypass network 104 may be assigned a first Internet Protocol (IP) address on the communications network 102, and a second IP address on the logical bypass network 104. It should be understood that computers common to the communications network 102 and to the logical bypass network 104 may share a common hub or switch, or other network device(s), but may nonetheless represent logically-separate networks that are generally incapable of communicating with one another without some type of translation or mediation therebetween. For example, as discussed in more detail herein, such translation and/or mediation may occur at a router or gateway that connects the communications network 102 and the logical bypass network 104.

The physical bypass network 106 represents, for example, a network that is at least partially physically separate from the communications network 102. For example, the physical bypass network 106 may include computers or other network devices that are different physical devices than those found on the communications network 102, and/or that communicate using different (types of) transmission media and/or techniques, and/or that are configured using a physically distinct network topology. For example, where the communications network 102 may include one or more local area networks (LANs) connected together in a wired fashion (e.g., using Ethernet and/or fiber), the physical bypass network 106 may include a satellite-based network, or a cellular network, or some other physically separate network, examples of which are discussed in more detail, herein.

Of course, although the example of FIG. 1 illustrates the logical bypass network 104 and the physical bypass network 106, it should be understood that these are merely intended as non-limiting examples, and that additional or alternative examples of bypass network(s) may be used in the multi-network immunization system 100. Further, although both the logical bypass network 104 and the physical bypass network 106 are illustrated in FIG. 1, it should be clear that, in any given implementation of the multi-network immunization system 100 (such as those described herein), only one such bypass network may be used.

As referenced herein, the logical bypass network 104 and/or the physical bypass network 106 may be used to prevent or reduce a propagation/replication of undesired code or behavior on the communications network 102. In the example of FIG. 1, a virus 108 is illustrated that represents and includes any such undesired code or behavior, including but not limited to, for example, malicious code that is created and/or distributed within the communications network 102 by a party desiring to harm or otherwise inconvenience users of the communications network 102. For example, the virus 108 may include self-replicating and/or self-propagating (and perhaps evolving) code that may infect network devices of the communications network 102, so as, for example, to destroy, modify, or create data on such network device(s). More generally, the virus 108 may represent and include virtually any code that attacks a confidentiality, integrity, availability, accountability, and/or accuracy of a device and/or transmission of the communications network 102. Even more generally, the virus 108 need not be malicious in the sense(s) just referenced, but may simply be undesired on the communications network 102 by an administrator or other user of the communications network 102. Further examples of the virus 108 are provided in more detail, herein.

An immunization system 110 is illustrated in the example of FIG. 1 that is operable to determine the virus 108 that is associated with the communications network 102. The immunization system 110 is further operable to distribute an anti-viral agent 112 and/or an anti-viral agent 114 onto the communications network 102 using a bypass network, e.g., the logical bypass network 104 and/or the physical bypass network 106. The logical bypass network 104 and/or the physical bypass network 106 is/are configured to provide transmission of the anti-viral agent 112 and/or the anti-viral agent 114 with at least one of a higher transmission speed, a higher transmission reliability, a higher transmission security, and/or a physically-separate transmission path, relative to transmission of the virus 108 on the communications network 102. In this way, the virus 108 may be prevented or limited from spreading or existing on the communications network 102.

In this regard, it should be understood that the virus 108 may replicate, exist, and/or propagate on the communications network 102 in a manner(s) that may be very fast and/or difficult to detect and/or destroy. In fact, in many cases, the virus 108 may be specifically engineered to be difficult to contain within the communications network 102. For example, the virus 108 may spread in a multi-cast or broadcast fashion, and may infect devices of the communications network 102 in a virtually exponential progression. In other examples, the virus 108 may be designed to infect devices of the communications network 102 and to take no action on an infected network device 116 of the communications network 102, at least initially, while the virus 108 spreads to a larger number of network devices. Then, the virus 108 may execute (e.g., after some pre-designated time or signal), so that a large number of already-infected and damaged devices are determined at once. Thus, in many cases, the virus 108 may have an inherent advantage (e.g., a "head-start") in propagating on the communications network 102, particularly since, for example, a curative or mitigating response to the virus 108 often may not be developed with sufficient specificity and effectiveness until the virus 108 is sufficiently examined and analyzed.

The multi-network virus immunization system 100 thus uses a bypass network, such as the logical bypass network 104 and/or the physical bypass network 106, to provide an alternate, out-of-band, or otherwise advantageous channel and/or path for transmission of the anti-viral agent 112 (and/or the anti-viral agent 114). As described herein, one or more characteristics and/or metrics of such bypass network(s) may enable distribution of the anti-viral agent(s) 112, 114 in an advantageous manner that enhances an effectiveness thereof in preventing or limiting the virus 108 on the communications network 102.

For example, the logical bypass network 104 may provide transmission of the anti-viral agent 112 to a non-infected network device 118 of the communications network 102 with a greater transmission speed, lower latency, effective speed, and/or faster delivery time than provided by the communications network 102 in delivering the virus 108 from the infected network device 116 to the non-infected network device 118. More generally, as the virus 108 spreads through the communications network 102, the immunization system 110 may use the logical bypass network 104 to distribute the anti-viral agent 112 ahead of the spreading of the virus 108. In this way, the anti-viral agent 112 may immunize non-infected (e.g., not-yet infected) network devices of the communications network 102, including the non-infected network device 118, against the virus 108. Accordingly, the spread of the virus 108 on the communications network 102 may be slowed or stopped, as fewer and fewer network devices on the communications network 102 are available as possible hosts for the virus 108.

Similar comments apply to the physical bypass network 106 in distributing the anti-viral agent 114. Moreover, as described herein, other characteristics and/or metrics associated with the physical bypass network 106 (and/or the logical bypass network 104) may be utilized in distributing the anti-virus agent 114 (and/or the anti-viral agent 112) on the communications network 102. For example, the physical bypass network 106 may provide transmission of the anti-viral agent 114 with a greater reliability and/or greater security than is available to the communications network 102 in transmitting the communications data and/or the virus 108. Greater reliability in this sense may include, for example, point-to-point and/or end-to-end reliability in transmitting the anti-viral agent 114 than is available to the communications network 102. Similarly, greater security may include, for example, greater point-to-point and/or end-to-end security (e.g., encryption). By using an effectively higher reliability and/or security, the physical bypass network 106 may increase the probability or expectation that the anti-viral agent 114 may be delivered to the communications network 102 in a way that is effective in stopping or otherwise limiting the spread of the virus 108.

In some example implementations, the anti-viral agent(s) 112, 114 also may be self-replicating and/or self-propagating. Thus, once deployed onto the communications network 102, the anti-viral agents 112, 114 may spread to a plurality of non-infected devices thereof, so that such non-infected devices may be rapidly immunized against the spread of the virus 108. Due to the advantage(s) provided by the characteristics of the logical bypass network 104 and the physical bypass network 106, respectively, the anti-viral agents 112, 114 may compensate for, or overcome, any advantages experienced by the virus 108 in propagating on the communications network 102, and may therefore be effective in stopping or otherwise limiting the propagation of the virus 108.

In the example of FIG. 1, the immunization system 110 includes a network monitor 120 that is operable to determine the virus 108 on the communications network 102. For example, the network monitor 120 may detect and/or identify the virus 108, by, for example, implementing detection rules 122, and/or using known virus data 124. For example, the detection rules 122 may specify parameters for selecting and scanning network devices of the communications network 102 (e.g., which or how many network devices should be scanned, and with what frequency), and the network monitor 120 may implement these and/or other examples of the detection rules 122. The network monitor 120 also may determine the virus 108 using known virus data 124, e.g., by comparing a signature of the virus 108 with known virus signatures stored therein, according to the detection rules 122. Various other examples of the nature and operation of the network monitor 120, the detection rules 122, and the virus data 124 are provided in more detail, herein.

The immunization system 110 also includes a response generator 126 that is operable to communicate with the network monitor 120 to generate a response to the virus 108. The response generator 126 may act according to response rules 128 that may govern, for example, a creation of the anti-viral agents 112, 114 and/or a distribution of the anti-viral agents 112, 114 using the logical bypass network 104 and/or the physical bypass network 106. For example, the response generator 126 may use the response rules 128 to determine which of the logical bypass network 104 and the physical bypass network 106 to use (in a case where both are available), or where and how to inject the anti-viral agents 112, 114 onto the communications network 102. The response rules 128 also may govern a manner in which the response generator 126 uses anti-viral agent data 130 to create, distribute, or otherwise provide the virus 108. For example, the response generator 126 may select from several possible anti-viral agents and/or distribution strategies available in the anti-viral agent data 130, based on information provided by the network monitor 120 and/or based on the response rules 128.

As another example, the response generator 126 may provide the anti-viral agent 114 by first distributing a reference 132 to the anti-viral agent 114 on the communications network 102, using the physical bypass network 106. For example, the reference 132 may include a pointer, link, or other identifier of the anti-viral agent 114, so that, for example, the non-infected network device 118 may obtain or otherwise access the actual anti-viral agent 114 itself, e.g., from the anti-viral agent data 130. Various other examples of the nature and operation of the response generator 126, the response rules 128, and/or the anti-viral agent data 130 are provided in more detail, herein.

In FIG. 1, the immunization system 110 is illustrated as being implemented on a (single, generic) device 134, which may represent virtually any computing device(s) capable of executing the functions and features described herein, including, for example, a desktop computer, a workstation computer, a server, a personal digital assistant (PDA) or cell phone, a laptop computer, a tablet personal computer, a networked computer, or a computing system comprised of a cluster of processors. Further, the immunization system 110 may be implemented in whole or in part on (or in association with) the infected network device 116, the non-infected network device 118, a network traffic manager 136 associated with the communications network 102 and the logical bypass network 104, or a network traffic manager 138 between the communications network 102 and physical bypass network 106. For example, the network traffic managers 136, 138 may include router(s), gateway(s), firewall(s), or other devices for implementing network policies and/or managing network traffic.

For example, the network traffic manager 136 may represent a router that provides translation between the communications network 102 and the logical bypass network 104, and that may be present on both of the communications network 102 and the logical bypass network 104. In some such example implementations, the network traffic manager 136 may implement the network monitor 120 and the detection rules 122 to detect the virus 108 on the communications network 102, and/or may implement the response generator 126 and/or the response rules 128 to distribute the anti-viral agent 112.

For example, the network traffic manager 136 may include a tag-prioritized router (e.g., implementing Multiprotocol Label Switching (MPLS)) that is operable to recognize and prioritize network traffic that is tagged as being associated with the anti-viral agent 112. For example, the top "n" tags of network traffic may be reserved on the network traffic manager 136 as being associated with the anti-viral agent 112. In this way, for example, the anti-viral agent 112 may be provided ahead of the virus 108 on the communications network 102, even when the communications network 102 and the logical bypass network 104 share the same computing devices and/or network traffic manager(s).

Also in FIG. 1, an entity 140 is illustrated as owning, assuring, guaranteeing, providing, or otherwise sponsoring the logical bypass network 104 and/or the physical bypass network 106. Although not directly illustrated in FIG. 1, it should be understood that the entity 140, or a different entity (not shown in FIG. 1) may sponsor the communications network 102, as well. Accordingly, the entity 140 may be responsible for implementing some or all of the immunization system 110 in conjunction with one or more of the communications network 102, the logical bypass network 104, the physical bypass network 106, and/or the network traffic managers 136, 138.

For example, the entity 140 may represent one or more of a network service provider or an antiviral service provider, and/or may represent a third-party entity that provides billing or other services associated with defining or providing the communications network 102 on behalf of a network service provider (e.g., may provide the communications network 102 as a virtual private network (VPN) having defined or desired characteristics or users, in exchange for a fee(s)). As such, (access to) one or more of the communications network 102, the logical bypass network 104, and/or the physical bypass network 106, may be provided in conjunction with a service level agreement (SLA) between the entity and a recipient/user of one or more of the communications network 102, the logical bypass network 104, and/or the physical bypass network 106. Thus, one or more of the communications network 102, the logical bypass network 104, and/or the physical bypass network 106 may be considered to be a managed network, e.g., managed by the entity 140. As such, one or more of the communications network 102, the logical bypass network 104, and/or the physical bypass network 106 may be operated essentially independently of one another and/or using separate/distinct management consoles.

Thus, as should be understood from the description provided herein, a user 142 may be provided with (or provided with access to) one or more of the communications network 102, the logical bypass network 104, and/or the physical bypass network 106. The user 142 may include, for example, a single consumer, employee, service provider, or other person(s), or may represent a corporation or other entity (e.g., a corporation providing the communications network 102 to employees as part of a corporate intranet).

Accordingly, the user 142 may obtain the benefit(s) of one or more of the communications network 102, the logical bypass network 104, and/or the physical bypass network 106, in exchange for payment provided to the entity 140. In this context, payment may refer generally to any type of monetary compensation, and/or non-monetary compensation, and/or economic value exchange. By way of example and not limitation, a payment may include a non-monetary payment, including a reduced or eliminated cost to the user 142, in exchange for a granting of certain rights or permissions to the entity 140 (such as, for example, granting the entity 140 rights to certain information of the user 142, including personal information of the user 142 for maintaining in a database for marketing or research purposes).

Figure 2:
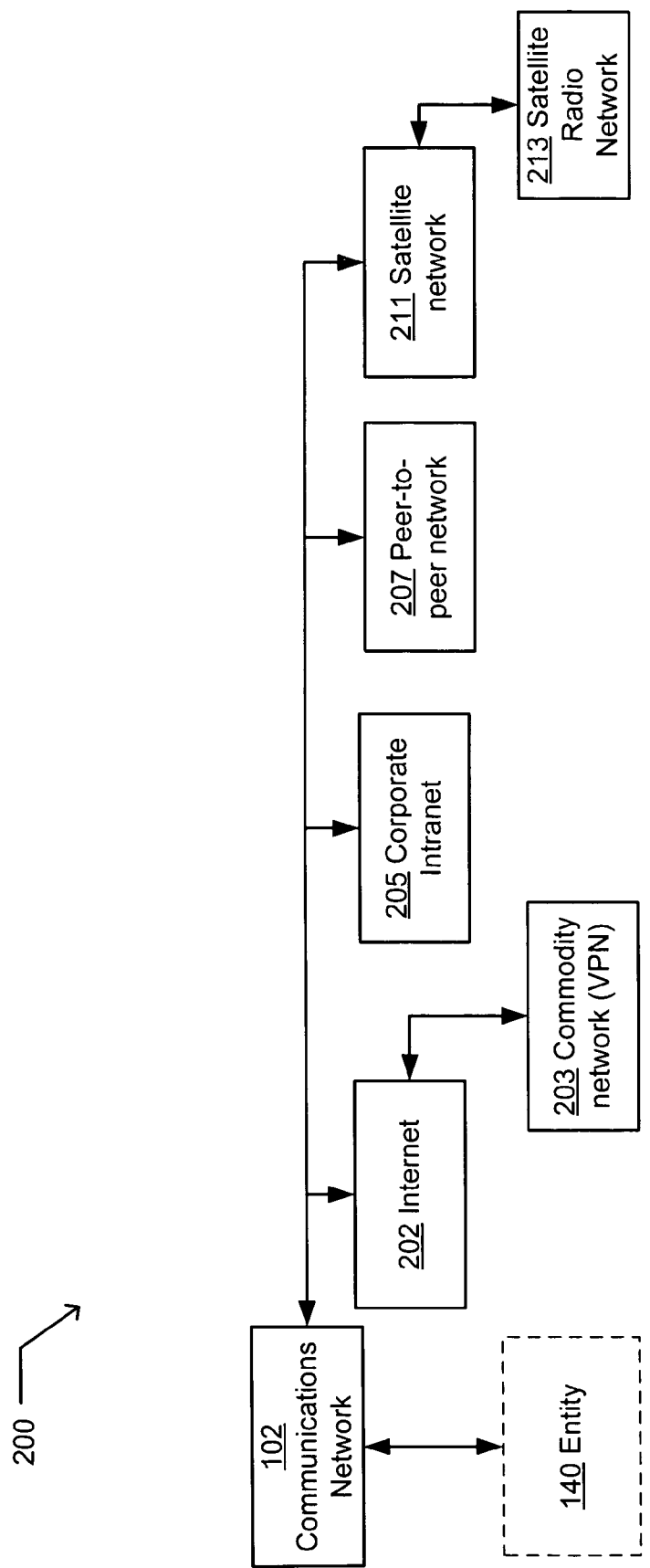
FIG. 2 illustrates example embodiments of a communications network of the multi-network virus immunization system of FIG. 1.

FIG. 2 illustrates example embodiments of the communications network 102 of the multi-network virus immunization system 110 of FIG. 1. In FIG. 2, the communications network 102 is illustrated as potentially including one or more of the public internet 202, a subset of the public internet 202 such as a commodity network 203 (e.g., a VPN), a corporate intranet 205, a peer-to-peer network 207, a satellite network 211, or a specific type of the satellite network 211 such as a satellite radio network 213. Of course, the examples in FIG. 2 are non-limiting examples of the communications network 102, and many other examples and implementations may be used. As should be understood from the description provided herein, the entity 140 may be associated with providing, or providing access to, one or more of the example networks 202-213 illustrated in FIG. 2.

Figure 3:
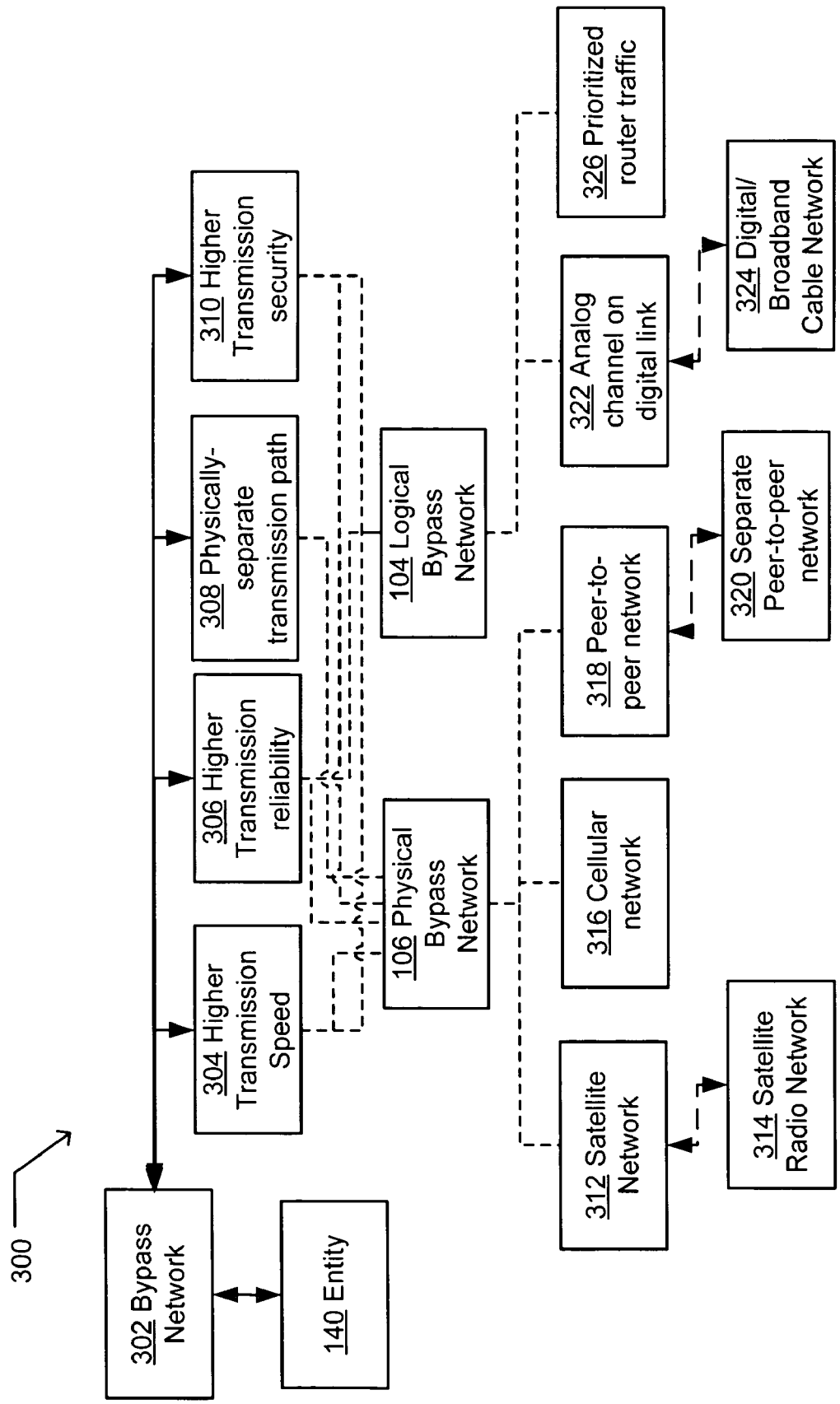
FIG. 3 illustrates example embodiments of bypass network(s) of the multi-network virus immunization system of FIG. 1.

FIG. 3 illustrates example embodiments of the bypass network(s) 104, 106 of the multi-network virus immunization system of FIG. 1. FIG. 3 illustrates a bypass network 302 that should be understood to represent or include one or both of the logical bypass network 104 and/or the physical bypass network 106, and/or another bypass network(s). As shown and described in more detail herein, the bypass network 302 may be configured to provide one or more of a higher transmission speed 304, a higher transmission reliability 306, a physically-separate transmission path 308, and/or a higher transmission security 310 relative to transmission of the virus 108 on the communications network 102.

In so doing, and as just referenced, the bypass network 302 may use the physical bypass network 106 and/or the logical bypass network 104. In FIG. 3, examples of the physical bypass network 106 are illustrated as including one or more of a satellite network 312 (including, potentially, a satellite radio network 314), a cellular network 316, or a peer-to-peer network 318 (including, potentially, a separate peer-to-peer network 320 that may be provided in conjunction with, but separately or independently from, the communications network 102, e.g., the peer-to-peer network 207).

Further in FIG. 3, the logical bypass network 104 is illustrated as including an analog channel on a digital link 322, including, for example, an analog channel on a digital/broadband cable network 324. The logical bypass network 104 also may include prioritized router traffic 326, such as, for example, the prioritized router traffic described herein with respect to the network traffic manager 136.

The entity 140 is illustrated in FIG. 3 as sponsoring or otherwise providing (or providing access to) the bypass network 302. Of course, it should be understood that the entity 140 may represent one or more entities, and that a different entity may sponsor or provide the communications network 102 than the entity that provides the bypass network 302.

Further in FIG. 3, the networks 104, 106, and 304-324 are illustrated with dashed lines to illustrate examples of how the bypass network 302 may be provided. Of course, again, the illustrated connections are merely illustrative, and are not limiting as to how the bypass network(s) may be connected, inter-connected, or otherwise provided.

Figure 4:
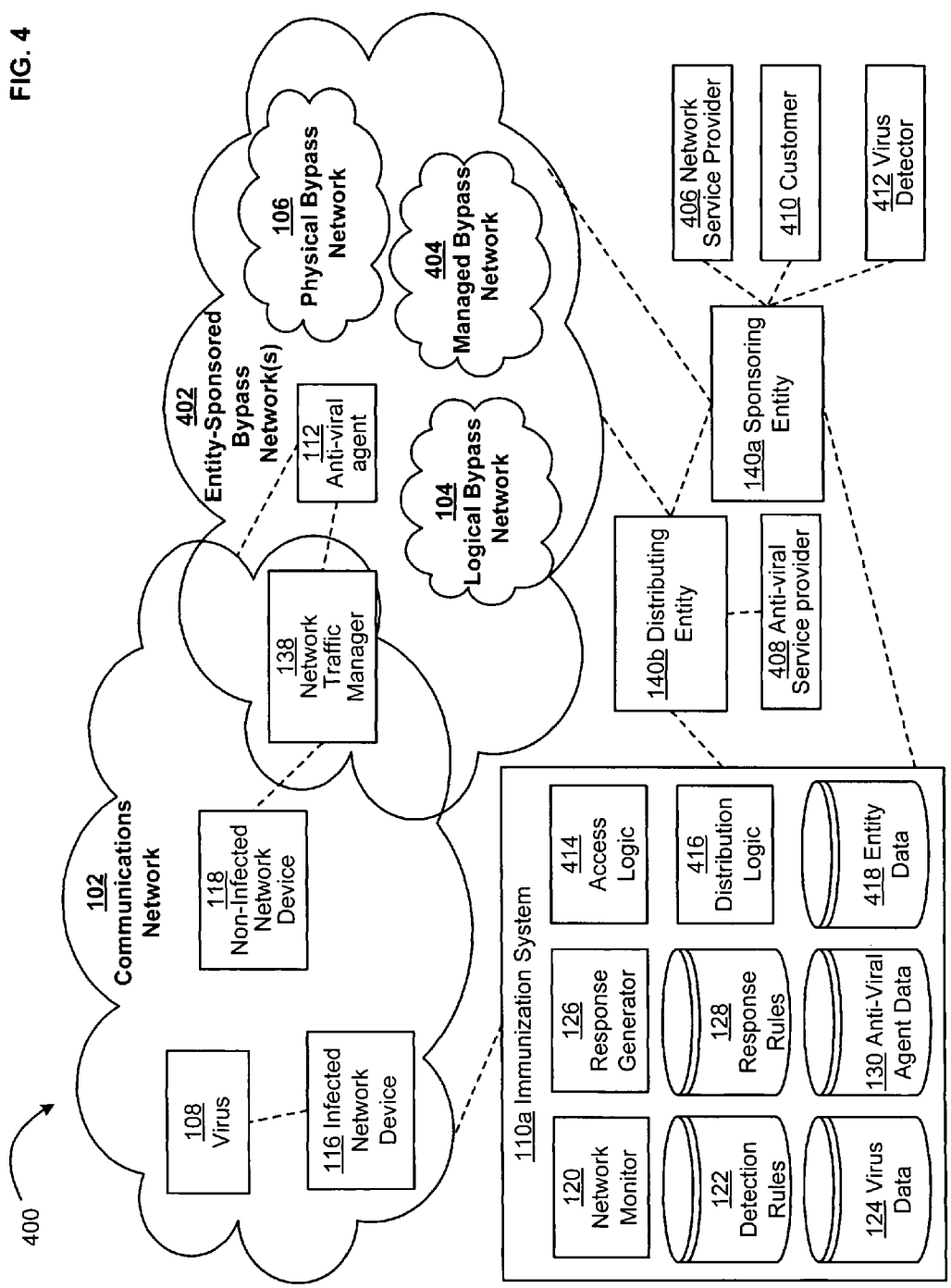
FIG. 4 illustrates an example immunization system for providing virus immunization using an entity-sponsored bypass network.

FIG. 4 illustrates an example immunization system 110a for providing virus immunization using an entity-sponsored bypass network(s) 402. As referenced herein, example techniques for implementing a bypass network for providing the anti-viral agent 112 include using the entity-sponsored bypass network(s) 402 to provide the anti-viral agent 112 to the communications network 102 for the purpose of, e.g., countering a spread or effect of the virus 108.

In this regard, as referenced herein, the use of the entity-sponsored bypass network(s) 402 may be considered to provide an example of use of the logical bypass network 104 and/or the physical bypass network 106. As shown in FIG. 4, the entity-sponsored bypass network(s) 402 also may include one or more managed bypass network(s) 404. Specific examples of such a managed bypass network 404 are provided herein, but may generally include virtually any logical and/or physical bypass network that is the subject of a contract or other agreement between a managing entity and a receiving entity, and that is at least partially controlled, administered, or provided by the managing entity for the purpose of (in the example of FIG. 4) providing the anti-viral agent 112.

In FIG. 4, examples of the entity 140 of FIG. 1 include a sponsoring entity 140a and a distributing entity 140b. In the example of FIG. 1, the sponsoring entity 140a may provide access to the entity-sponsored bypass network(s) 402 for a distributing entity 140b. For example, the distributing entity 140b may have a vested interest in distributing the anti-viral agent 112 onto the communications network 102, and, in so doing, in protecting the devices thereof from the virus 108, such as when the distributing entity 140b seeks to disinfect the infected network device 116, and/or immunize the non-infected network device 118.

The distributing entity 140b, however, may not have the resources, ability, or desire to construct, maintain, or otherwise provide the entity-sponsored bypass network(s) 402. Instead, the sponsoring entity 140b may provide or otherwise sponsor the entity-sponsored bypass network(s) 402, for the purpose of assisting in the distribution of the anti-viral agent 112, and/or for other (perhaps unrelated) purposes. Moreover, when providing the distribution of the anti-viral agent 112, the sponsoring entity 140a may provide an assurance of a transmission characteristic of the entity-sponsored bypass network(s) 402, where such a transmission characteristic may include, for example, a certain transmission speed, or a certain quality of service (other examples of transmission characteristic(s) are provided herein).

For example, the sponsoring entity 140a may include a network service provider 406. The network service provider 406 may provide one or more networks to a large and potentially diverse audience of users, ranging, for example, from individual consumers to large corporations. Such users may be diverse in the sense of their respective needs or expectations for a provided network(s), and may be geographically diverse, as well.

Consequently, providing network service to such users may require a large investment in obtaining (and maintaining) the various physical media that may be used (e.g., fiber optic transmission, satellite transmission, digital subscriber line (DSL) transmission, or any other network access techniques/ media). Since no single technique/media may be suitable or available to deploy a large-scale network, such investments may span a number of combinations of such techniques and media, in order to reach an intended audience. Moreover, the network service provider 406 itself may be unable or unwilling to provide all required resources for a given network, and may lease or otherwise bargain for access to network access from other network service provider(s) (not specifically illustrated in FIG. 4).

In short, deployment of the entity-sponsored bypass network(s) 402 may require an investment or effort that may not be possible, desirable, and/or cost-effective for the distributing entity 140b to undertake. Nonetheless, the distributing entity 140b may wish to access the entity-sponsored bypass network(s) 402 in order to distribute the anti-viral agent on the communications network 102 (e.g., in the manner(s) described above with respect to FIG. 1, or otherwise described herein). For example, the distributing entity 140b may include an anti-viral service provider 408 that implements a business model based on protecting the communications network 102 from the virus 108 and other threats. Therefore, as described herein, the sponsoring entity 140a may provide such access to the entity-sponsored bypass network(s) 402 to the anti-viral service provider 408, perhaps for a fee or other compensation, and may assure the anti-viral service provider 408 (or other distributing entity 140b) of the availability and desired use thereof.

As another example, the sponsoring entity 140a may include a customer 410 of the network service provider 406. For example, the network service provider 406 may provide physical resources for one or more large-scale networks, and the customer 410 may represent a corporation or other entity that pays for some type of access to, or use of, at least one of these networks. For example, the customer 410 may be a corporation that pays the network service provider 406 to provide a corporate intranet, such as, for example, a nationwide virtual private network (VPN) that is accessible only to the employees of the customer 410.

Thus, the customer 410 also may act as the sponsoring entity 140a, and may provide access to the entity-sponsored bypass network(s) 402 to the distributing entity 140b for distribution of the anti-viral agent 112 in a desired manner. For example, where the customer 410 includes a corporation, the distributing entity 140b may include a subsidiary or subset of the corporation charged with protecting the corporation's computers from the virus 108. As another example, the corporation (customer 410) may contract with the anti-viral service provider 408 to obtain virus protection therefrom for its corporate intranet.

As yet another example, the sponsoring entity 140a may include a virus detector 412. For example, the virus detector 412 may represent or include an entity and/or software that detects and/or identifies a virus, such as the virus 108, on the communications network 102. For example, the virus detector 412 may detect the virus 108 and determine a signature of the virus 108 for comparison to known signatures (e.g., using the network monitor 120, the detection rules 122, and the virus data 124 of the immunization system 110a). Upon detection and identification of the virus 108, the virus detector 412 may be involved in notifying the distributing entity 140b thereof, and thereafter may be involved in providing access to, and/or use of, the entity-sponsored bypass network(s) 402.

Although FIG. 1 illustrates several examples of the sponsoring entity 140a and the distributing entity 140b, it should be understood that these are non-limiting examples for the purposes of illustration, and many other examples may exist. For example, the sponsoring entity 140a may include combinations of the two or more of the network service provider 406, the customer 410, and/or the virus detector 412. As another example, the anti-viral service provider 408 also may act as the sponsoring entity 140a. Conversely, any of the network service provider 406, the customer 410, and/or the virus detector 412, or substantially any combination thereof, may act as the distributing entity 140b.

In providing the functions and services described herein, the sponsoring entity 140a and/or the distributing entity 140b may use, access, or provide some or all of the immunization system 110a. For example, the distributing entity 140b may implement the network monitor 120, the detection rules 122, the virus data 124, the response generator 126, the response rules 128, and/or the anti-viral agent data 130, as those components are described above with respect to FIG. 1. Meanwhile, the sponsoring entity 140a may implement additional or alternative components, e.g., access logic 414, distribution logic 416, and entity data 418.

For example, the access logic 414 may include logic to determine whether and how to provide access to the distributing entity 140b. For example, the access logic 414 may include authorization and authentication logic, e.g., by receiving a request from the distributing entity 140b and then checking pre-stored entity data 418 to determine whether the distributing entity 140b has previously paid for access to the entity-sponsored bypass network(s) 402.

Once access has been granted, the distribution logic 416 may be used to ensure that the distributing entity 140b receives a desired transmission or other distribution of the anti-viral agent 112, using the entity-sponsored bypass network(s) 402. For example, the distributing entity 140b may contract with the sponsoring entity 140a to obtain a distribution of the anti-viral agent 112 with a certain transmission speed over the entity-sponsored bypass network(s) 402. The distribution logic 416 may, upon granting of access to the distributing entity 140b, determine and enforce this transmission speed of the anti-viral agent 112 on the entity-sponsored bypass network(s) 402. Of course, transmission speed is only one example of various transmission characteristics that may be assured by the sponsoring entity 140a (e.g., by the distribution logic 416) for distributing the anti-viral agent 112 over the entity-sponsored bypass network(s) 402.

FIG. 5 illustrates an operational flow representing example operations related to techniques for virus immunization using an entity-sponsored bypass network. In FIG. 5 and in following figures that include various examples of operational flows, discussion and explanation may be provided with respect to the above-described examples of FIGS. 1-4, and/or with respect to other examples and contexts. However, it should be understood that the operational flows may be executed in a number of other environments and contexts, and/or in modified versions of FIGS. 1-4. Also, although the various operational flows are presented in the sequence(s) illustrated, it should be understood that the various operations may be performed in other orders than those which are illustrated, or may be performed concurrently.

After a start operation, the operational flow 500 moves to a providing operation 510 in which access may be provided to at least one bypass network. For example, the sponsoring entity 140a may provide access to the distributing entity 140b. As a more specific example, the anti-viral service provider 408 may detect the virus 108 on the communications network 102 (e.g., using the network monitor 120, detection rules 122, and/or the virus data 124). The anti-viral service provider 408 may determine that the entity-sponsored bypass network(s) 402 would be useful to distribute the anti-viral agent 112, and may request access to the entity-sponsored bypass network(s) 402. The network service provider 406 may implement the access logic 414 to determine that the anti-viral service provider 408 is entitled to access the entity-sponsored bypass network(s) 402, and may thereafter provide the access thereto.

In a providing operation 520, distribution of an anti-viral agent onto a communications network associated with a virus may be provided, using the at least one bypass network. For example, the sponsoring entity 140a may provide for the distribution of the anti-viral agent 112 onto the communications network 102 that may be associated with the virus 108, using the entity-sponsored bypass network(s) 402. Continuing the more specific example just discussed, the network service provider 406 may implement the distribution logic 416 to distribute the anti-viral agent 112 in a manner desired by the anti-viral service provider 408. For example, the anti-viral service provider 408 may express that the virus 108 presents a very high threat level, and may request the highest-available distribution priority/speed. Accordingly, the network service provider 406 may implement the distribution logic 416 to determine that the physical bypass network 106 (e.g., a satellite network) provides such distribution, and may provide such distribution to the anti-viral service provider 408.

In a providing operation 530, an entity-sponsored assurance of a transmission characteristic of the at least one bypass network with respect to providing the distribution may be provided. For example, the sponsoring entity 140a may provide such an assurance of a transmission characteristic (e.g., transmission speed, transmission quality, and/or transmission security). Continuing the specific example above, the network service provider 406 may provide an assurance to the anti-viral service provider 408 that the physical bypass network 106 will provide a specified transmission speed when distributing the anti-viral agent 112.

As a result of the operations 510-530, operation(s) may be performed that are related either to a local or remote storage of digital data, or to another type of transmission of digital data. As discussed herein, in addition to providing, accessing, querying, recalling, or otherwise determining or using the digital data for the operations 510-530, operations may be performed related to storing, assigning, associating, or otherwise archiving the digital data to a memory, including, for example, sending and/or receiving a transmission of the digital data from a remote memory. Accordingly, any such operation(s) may involve elements including at least an operator (e.g., either human or computer) directing the operation, a transmitting computer, and/or a receiving computer, and should be understood to occur within the United States as long as at least one of these elements resides in the United States.

Figure 6:
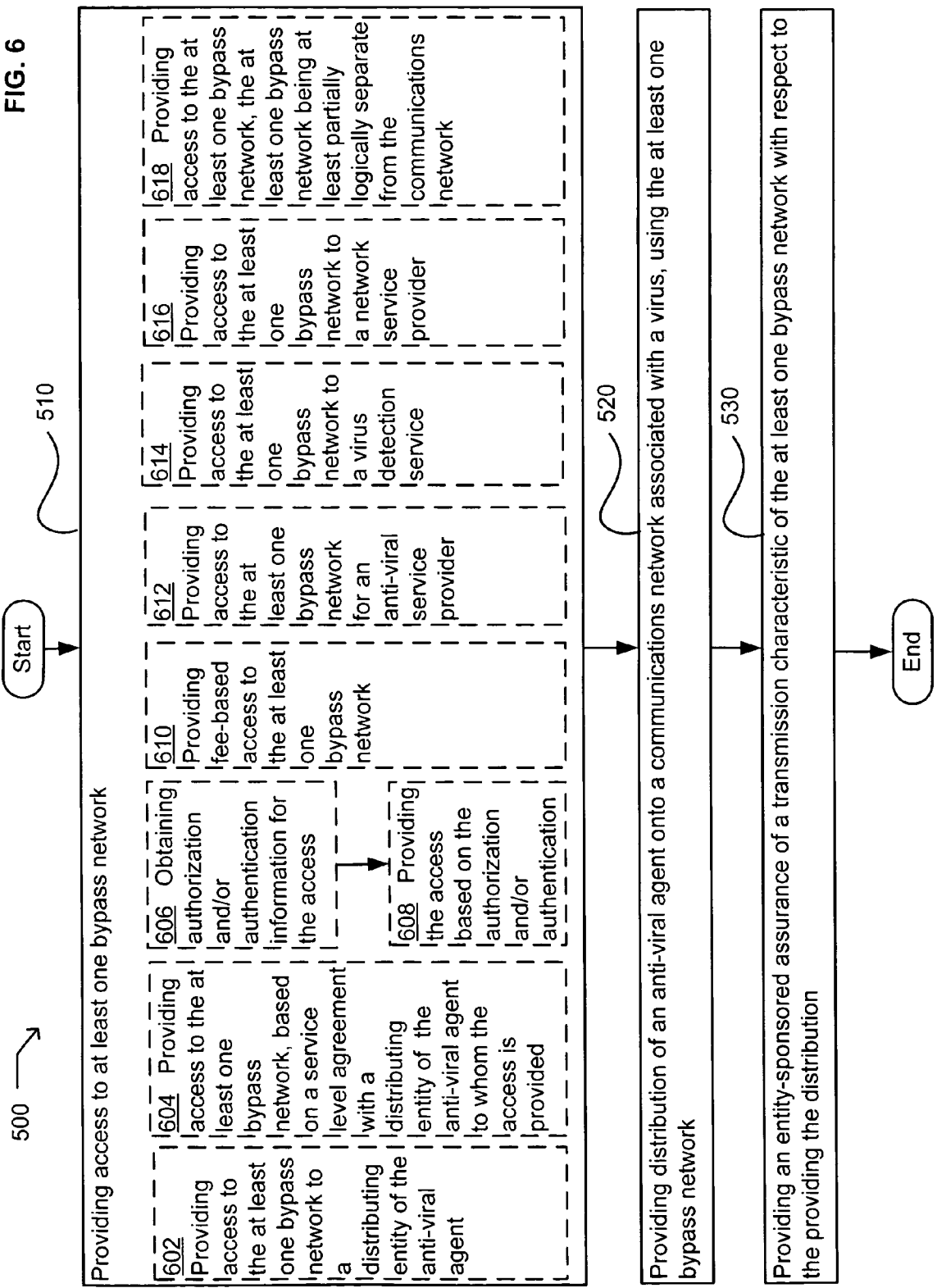
FIG. 6 illustrates an alternative embodiment of the example operational flow of FIG. 5.

FIG. 6 illustrates alternative embodiments of the example operational flow 500 of FIG. 5. FIG. 6 illustrates example embodiments where the providing operation 510 may include at least one additional operation. Additional operations may include an operation 602, an operation 604, an operation 606, an operation 608, an operation 610, an operation 612, an operation 614, an operation 616, and/or an operation 618.

At the operation 602, access to the at least one bypass network is provided to a distributing entity of the anti-viral agent. For example, the sponsoring entity 140a may provide access to the entity-sponsored bypass network(s) 402 to the distributing entity 140b, e.g., the anti-viral service provider 408, perhaps in response to a request from the distributing entity 140b for such access.

At the operation 604, access to the at least one bypass network is provided, based on a service level agreement with a distributing entity of the anti-viral agent to whom the access is provided. For example, as just mentioned, the sponsoring entity 140a may provide access to the entity-sponsored bypass network(s) 402 to the distributing entity 140b. In the example of the operation 604, the entity-sponsored bypass network(s) 402 may include the managed bypass network 404, and the sponsoring entity 140a may provide access to thereto based on a service level agreement (SLA) with the distributing entity.

In this context, the managed bypass network 404 may be understood to include, in some examples, a logical network using prioritized routing of data thereon. For example, the managed bypass network 404 may use label-switched routing, which also may be referred to as label-switching or similar terms, in which the managed bypass network 404 (including, e.g., the network traffic manager 138) may route data packets based on associated label(s). In such cases, data traffic of the distributing entity 140b (e.g., the anti-viral agent 112) may be associated with a label that prioritizes transmission thereof. One example of such label-switching, as referenced above, is known as Multi-Protocol Label Switching (MPLS).

In the example of MPLS, data of the distributing entity 140b may be assigned a preferred transmission class, e.g., Forwarding Equivalence Class (FEC), that allows a desired distribution thereof. In some examples, such preferred forwarding may be accomplished through the use of queue scheduling priority, e.g., within one or more queues (not shown in FIG. 4) of the network traffic manager 138. In other, similar examples, the managed bypass network 404 may implement a policy of Differentiated Services (DiffServ). DiffServ may be used to provide a minimum level of quality of service (QoS) for data of the distributing entity 140b. Thus, it may be understood that MPLS, DiffServ, or other prioritized routing or transmission techniques may be implemented, based on the SLA between the sponsoring entity 140a and the distributing entity 140b.

At the operation 606, authorization and/or authentication information for the access may be obtained. For example, the sponsoring entity 140a may obtain such authorization and/or authentication information from the distributing entity 140b, such as when the distributing entity 140b wishes to access the entity-sponsored bypass network(s) 402 to distribute the anti-viral agent 112. At the operation 608, the access may be provided based on the authorization and/or authentication. For example, the sponsoring entity 140a may provide access to the entity-sponsored bypass network(s) 402 based on authentication information obtained from the distributing entity 140b. As a more specific example, the sponsoring entity 140a may implement the access logic to obtain a username and password from the distributing entity 140b, for comparison against the entity data 418, to determine that the distributing entity 140b is entitled to a certain type or level of access to the entity-sponsored bypass network(s) 402.

At the operation 610, fee-based access to the at least one bypass network may be provided. For example, the sponsoring entity 140a may accept a fee from the distributing entity 140b for accessing the entity-sponsored bypass network(s) 402. As would be apparent, such a fee may be based on monthly or yearly access, or may be based on actual usage of the entity-sponsored bypass network(s) 402.

At the operation 612, access to the at least one bypass network may be provided for an anti-viral service provider. For example, the sponsoring entity 140a may provide access to the anti-viral service provider 408, for distribution thereby of the anti-viral agent 112.

At the operation 614, access to the at least one bypass network may be provided to a virus detection service. For example, the sponsoring entity 140a may include the network service provider 406, and the distributing entity 140b may include the virus detector 412. In this example, then, the network service provider 406 may provide the virus detector 412 with access to the entity-sponsored bypass network(s) 402.

At the operation 616, access to the at least one bypass network may be provided to a network service provider. For example, the sponsoring entity 140a may include a first network service provider, such as the network service provider 406, and the distributing entity 140b may include a second network service provider (not shown in FIG. 4), which may receive access to the entity-sponsored bypass network(s) 402 from the network service provider 406.

At the operation 618, access to the at least one bypass network may be provided, the at least one bypass network being at least partially logically separate from the communications network. For example, the sponsoring entity 140a, perhaps using the access logic 414, may provide the distributing entity 140b with access to the logical bypass network 104.

Figure 7:
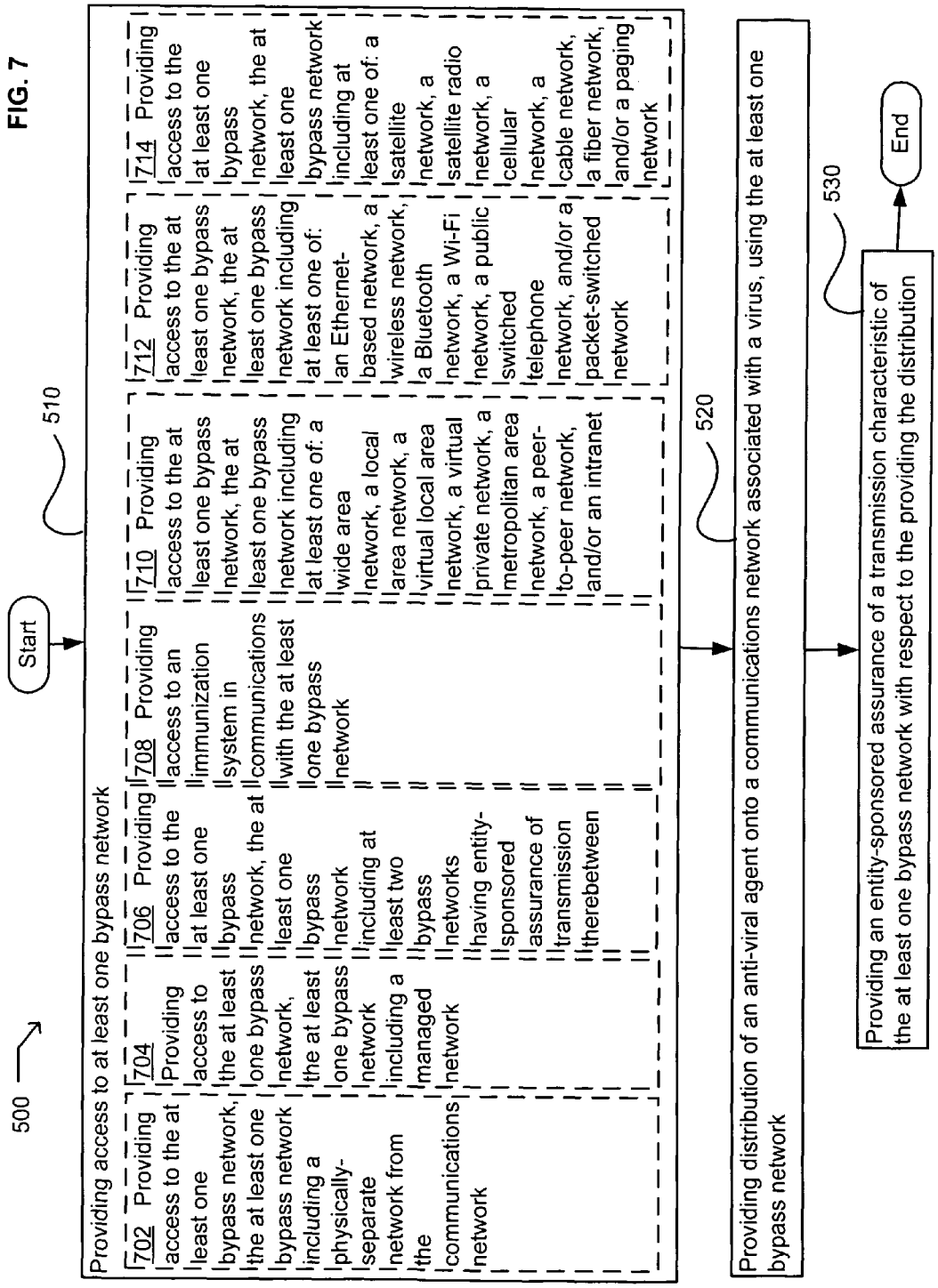
FIG. 7 illustrates an alternative embodiment of the example operational flow of FIG. 5.

FIG. 7 illustrates alternative embodiments of the example operational flow 500 of FIG. 5. FIG. 7 illustrates example embodiments where the providing operation 510 may include at least one additional operation. Additional operations may include an operation 702, an operation 704, an operation 706, an operation 708, an operation 710, an operation 712, and/or an operation 714.

At the operation 702, access to the at least one bypass network may be provided, the at least one bypass network including a physically-separate network from the communications network. For example, the sponsoring entity 140a may provide the distributing entity 140b with access to the physical bypass network 106.

At the operation 704, access to the at least one bypass network may be provided, the at least one bypass network including a managed network. For example, the sponsoring entity 140a may provide the distributing entity 140b with access to the managed network 404. As should be understood from the present description, the managed network 404 may include a VPN and/or a label-switched network, perhaps implemented using MPLS or DiffServ, and perhaps based on a SLA.

At the operation 706, access to the at least one bypass network may be provided, the at least one bypass network including at least two bypass networks having entity-sponsored assurance of transmission therebetween. For example, the sponsoring entity 140a may provide the distributing entity 140b with access to two or more of the logical bypass network 104, the managed bypass network 404, and/or the physical bypass network 106. In this regard, for example, it should be understood that, as referenced above, the network service provider 406 may be responsible for various types of networks and network transmission media. For example, one type of transmission media (e.g., fiber optics) may be suitable or available in one geographical area, while only another type of transmission media (e.g., satellite transmission) may be suitable or available in another area. The network service provider 406 may own, maintain or otherwise be responsible for these various networks and/or network transmission media, and may provide access to/across some or all of these to the distributing entity 140b.

At the operation 708, access to an immunization system in communications with the at least one bypass network may be provided. For example, the sponsoring entity 140a may provide the distributing entity 140b with access to the immunization system 110a. For example, the distributing entity 140b may include the customer 410 or other customer that may use a corporate intranet provided by the network service provider 406. In such a case, the distributing entity 140b may have few or no resources for countering the virus 108, and in these or similar cases, the sponsoring entity 140a may provide access to at least a portion of the immunization system 110a, e.g., as a service, to the distributing entity 140b. In this way, the customer 410 of this example(s) may monitor/detect the virus 108, formulate a response, and then may use the entity-sponsored bypass network(s) 402 to distribute the anti-viral agent 112 accordingly.

At the operation 710, access to the at least one bypass network may be provided, the at least one bypass network including at least one of: a wide area network, a local area network, a virtual local area network, a virtual private network, a metropolitan area network, a peer-to-peer network, and/or an intranet. Such examples of the entity-sponsored bypass network(s) 402, and other examples, may be understood from FIG. 3 and the associated description provided herein, e.g., with reference to the networks 304-326. For example, the sponsoring entity 140a may provide the entity-sponsored bypass network(s) 402 as including a plurality of local area networks (and/or virtual local area networks) that are interconnected by a wide area network, with associated uplinks and connections that allow the sponsoring entity 140a to maintain the entity-sponsored bypass network(s) 402 as a secure, private, convenient, and cost-effective resource for the distributing entity 140b to distribute the anti-viral agent 112.

At the operation 712, access to the at least one bypass network may be provided, the at least one bypass network including at least one of: an Ethernet-based network, a wireless network, a Bluetooth network, a Wi-Fi network, a public switched telephone network, and/or a packet-switched network. For example, as referenced herein, the entity-sponsored bypass network(s) 402 may include a corporate network that is provided as a wireless network across a campus(es) of the corporation, and that is reserved for transmitting certain data, e.g., the anti-viral agent 112.

At the operation 714, access to the at least one bypass network may be provided, the at least one bypass network including at least one of: a satellite network, a satellite radio network, a cellular network, a cable network, a fiber network, and/or a paging network. For example, as illustrated in FIG. 3, the entity-sponsored bypass network(s) 402 may include one or more of the satellite network 312, or the cellular network 316.

Figure 8:
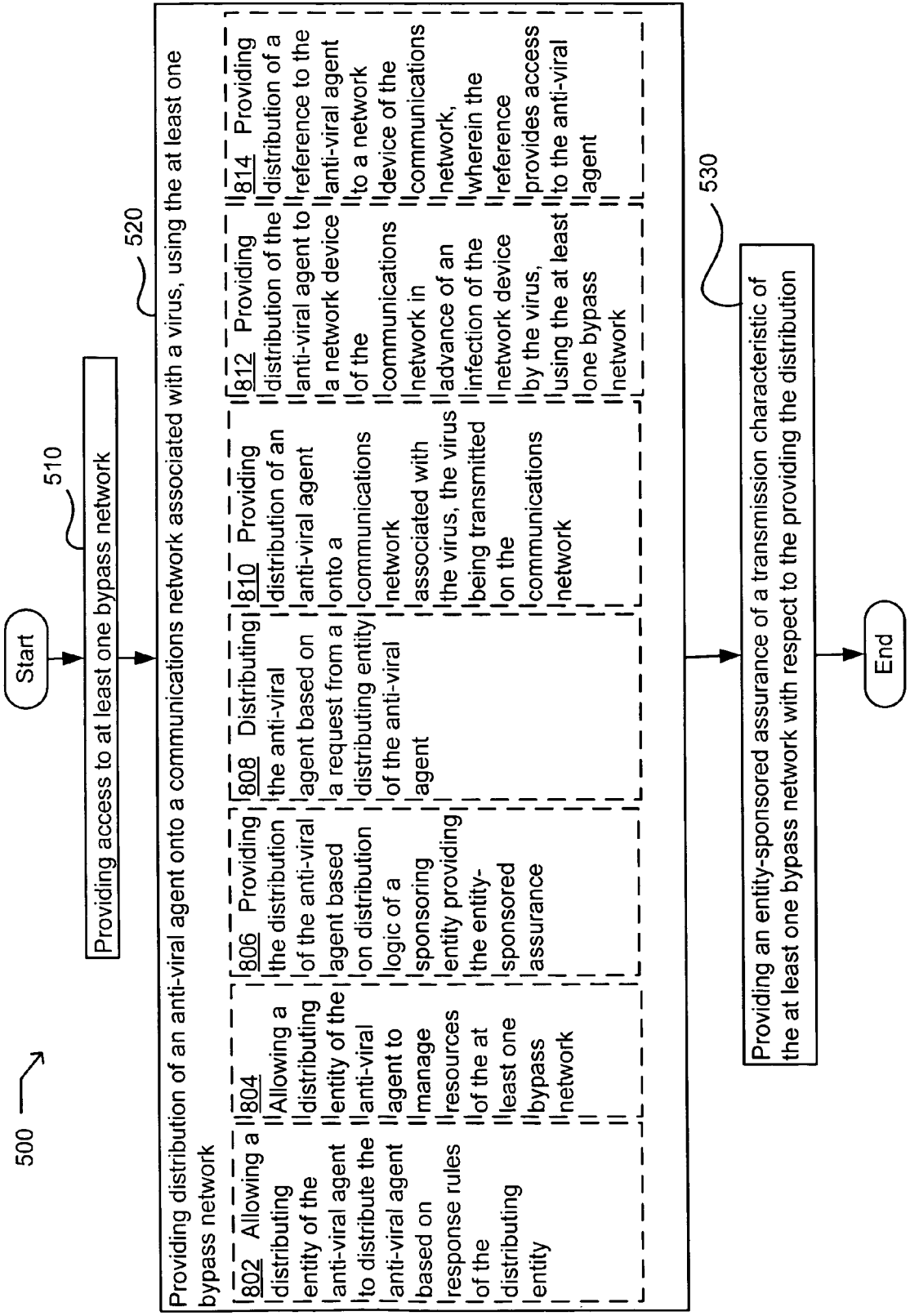
FIG. 8 illustrates an alternative embodiment of the example operational flow of FIG. 5.

FIG. 8 illustrates alternative embodiments of the example operational flow 500 of FIG. 5. FIG. 8 illustrates example embodiments where the providing operation 520 may include at least one additional operation. Additional operations may include an operation 802, an operation 804, an operation 806, an operation 808, an operation 810, an operation 812, and/or an operation 814.

At the operation 802, a distributing entity of the anti-viral agent may be allowed to distribute the anti-viral agent based on response rules of the distributing entity. For example, the distributing entity 140b may be allowed to distribute the anti-viral agent 112 based on the response rules 128 of the immunization system 110a.

At the operation 804, a distributing entity of the anti-viral agent may be allowed to manage resources of the at least one bypass network. For example, the sponsoring entity 140a may allow the distributing entity 140b to manage resources of the entity-sponsored bypass network(s) 402, e.g., the physical bypass network 106. For example, the distributing entity 140b may be allowed to manage an available bandwidth that may be used (e.g., within a defined range).

At the operation 806, the distribution of the anti-viral agent may be provided based on distribution logic of a sponsoring entity providing the entity-sponsored assurance. For example, the sponsoring entity 140a may provide the distribution of the anti-viral agent 112 based on the distribution logic 416. For example, the distribution logic 416 may dictate that where the communications network 102 includes a tree-structured or hierarchical network, the anti-viral agent 112 should be distributed first to network nodes having the largest number of branches stemming therefrom, so as to increase an efficacy of the distribution in containing the virus 108.

At the operation 808, the anti-viral agent may be distributed based on a request from a distributing entity of the anti-viral agent. For example, the sponsoring entity 140a may receive a request from the distributing entity 140b. For example, the request may be in accordance with a SLA or other contractual relationship, or may be on an as-needed basis.

At the operation 810, distribution of an anti-viral agent onto a communications network associated with the virus may be provided, the virus being transmitted on the communications network. For example, the sponsoring entity 140a may allow the distributing entity 140b to distribute the anti-viral agent 112 onto the communications network 102, where the virus 108 may be transmitted on the communications network 102 (e.g., the virus 108 may be present on the infected network device 116, with the potential to be transmitted to the non-infected device 118).

At the operation 812, distribution of the anti-viral agent to a network device of the communications network in advance of an infection of the network device by the virus may be provided, using the at least one bypass network. For example, the sponsoring entity 140a may allow the distributing entity 140b to distribute the anti-viral agent 112 to the non-infected device 118 of the communications network 102, in advance of an arrival of the virus 108 from the infected device 116, using the entity-sponsored bypass network(s) 402.

At the operation 814, distribution of a reference to the anti-viral agent to a network device of the communications network may be provided, wherein the reference provides access to the anti-viral agent. For example, the sponsoring entity 140a may allow the distributing entity 140b to use the entity-sponsored bypass network(s) 402 to distribute a link, pointer, or other reference to the anti-viral agent 112, rather than to distribute the anti-viral agent 112 itself. For example, the non-infected device 118 may receive a link to access a network location at which the anti-viral agent 112 is stored.

Figure 9:
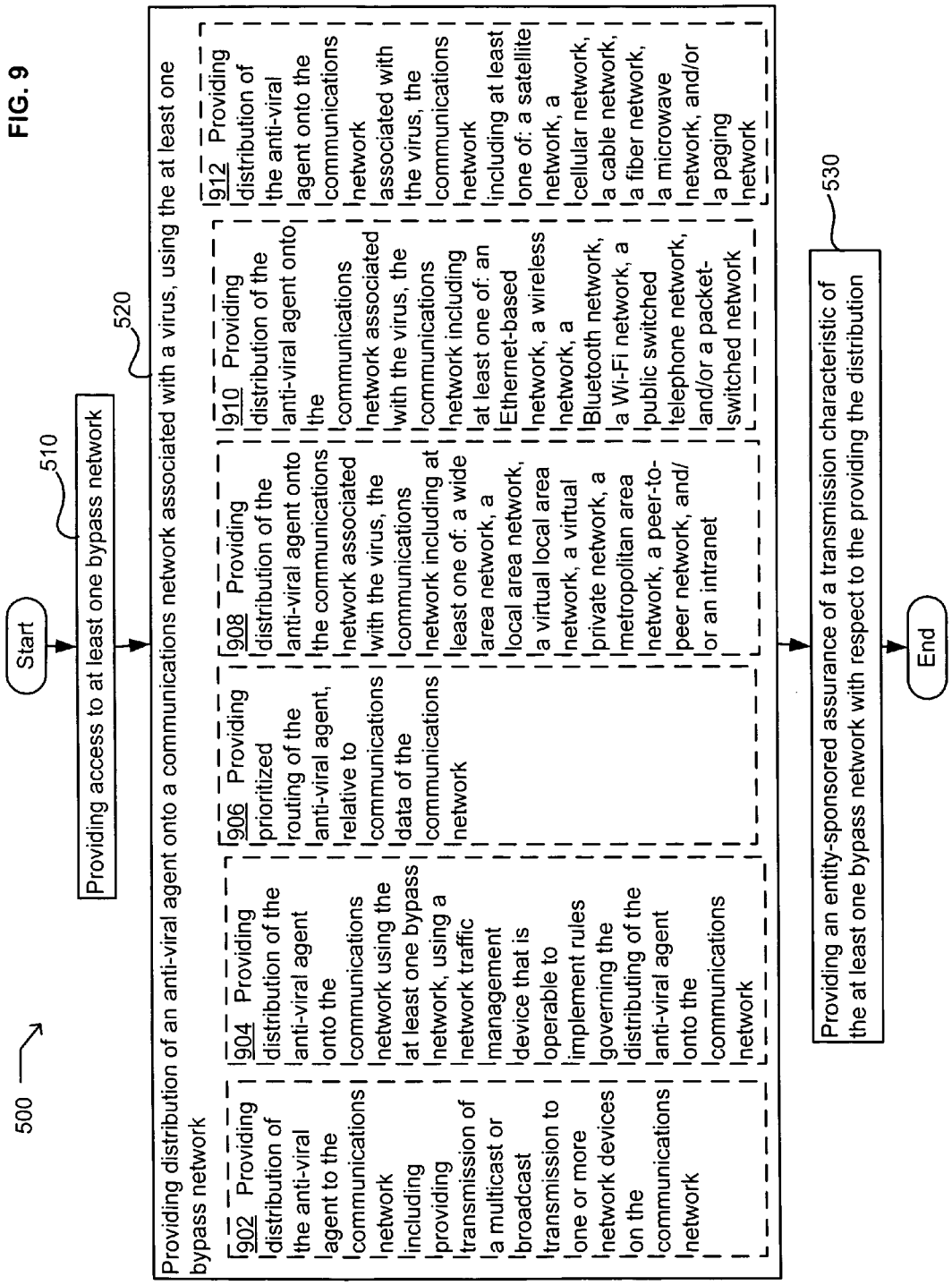
FIG. 9 illustrates an alternative embodiment of the example operational flow of FIG. 5.

FIG. 9 illustrates alternative embodiments of the example operational flow 500 of FIG. 5. FIG. 9 illustrates example embodiments where the providing operation 520 may include at least one additional operation. Additional operations may include an operation 902, an operation 904, an operation 906, an operation 908, an operation 910, and/or an operation 912.

At the operation 902, distribution of the anti-viral agent to the communications network may be provided, including providing transmission of a multicast or broadcast transmission to one or more network devices on the communications network. For example, the sponsoring entity 140a may allow the distributing entity 140b to initiate a multicast or broadcast transmission of the anti-viral agent 112 to devices of the communications network 102 (e.g., to the non-infected network device 118 and similarly-situated devices), using the entity-sponsored bypass network(s) 402. As a more specific example, such multicast or broadcast transmissions may be governed by, or implemented by, the distribution logic 416.

At the operation 904, distribution of the anti-viral agent onto the communications network using the at least one bypass network may be provided, using a network traffic management device that is operable to implement rules governing the distributing of the anti-viral agent onto the communications network. For example, the network traffic manager 138 may be included in the entity-sponsored bypass network(s) 402, and also may be configured to communicate with the communications network 102. For example, the network traffic manager 138 may include a router that performs a translation function between data on the entity-sponsored bypass network(s) 402 and data on the communications network 102. Accordingly, the network traffic manager 138 may implement rules for governing distribution of the anti-viral agent 112 onto the communications network 102; e.g., may implement at least some of the response rules 128 and/or the distribution logic 416.

At the operation 906, prioritized routing of the anti-viral agent, relative to communications data of the communications network, may be provided. For example, as referenced herein, the sponsoring entity 140a may provide or allow for distribution of the anti-viral agent 112 using MPLS, DiffServ, and/or prioritized queue scheduling, e.g., using the network traffic manager 138 and similar or comparable devices.

At the operation 908, distribution of the anti-viral agent onto the communications network associated with the virus may be provided, the communications network including at least one of: a wide area network, a local area network, a virtual local area network, a virtual private network, a metropolitan area network, a peer-to-peer network, and/or an intranet. For example, as illustrated in FIG. 2, the communications network 102 may include the peer-to-peer network 207, or may include the corporate intranet 205.

At the operation 910, distribution of the anti-viral agent onto the communications network associated with the virus may be provided, the communications network including at least one of: an Ethernet-based network, a wireless network, a Bluetooth network, a Wi-Fi network, a public switched telephone network, and/or a packet-switched network. For example, as illustrated in FIG. 2, the communications network 102 may include the corporate intranet 205 that may be provided as a wireless network across a campus(es) of the corporation.

At the operation 912, distribution of the anti-viral agent onto the communications network associated with the virus may be provided, the communications network including at least one of: a satellite network, a cellular network, a cable network, a fiber network, a microwave network, and/or a paging network. For example, as illustrated in FIG. 2, the communications network 102 may include the satellite network 211 or the satellite radio network 213.

Figure 10:
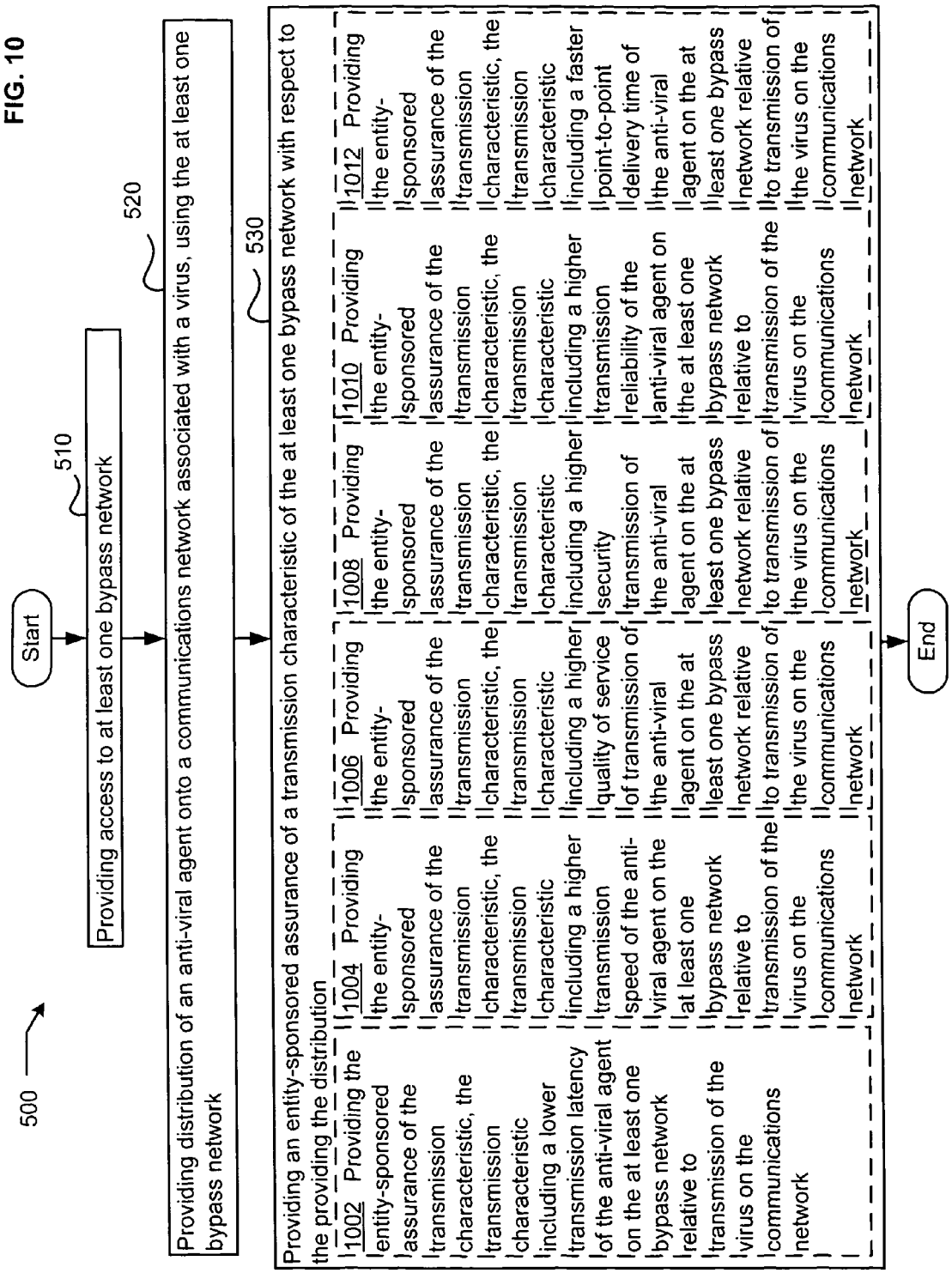
FIG. 10 illustrates an alternative embodiment of the example operational flow of FIG. 5.

FIG. 10 illustrates alternative embodiments of the example operational flow 500 of FIG. 5. FIG. 10 illustrates example embodiments where the providing operation 530 may include at least one additional operation. Additional operations may include an operation 1002, an operation 1004, an operation 1006, an operation 1008, an operation 1010, and/or an operation 1012.

At the operation 1002, the entity-sponsored assurance of the transmission characteristic may be provided, the transmission characteristic including a lower transmission latency of the anti-viral agent on the at least one bypass network relative to transmission of the virus on the communications network. For example, lower transmission latency may include higher transmission speed on the entity-sponsored bypass network(s) 402 than on the communications network 102, but also may include lower network congestion and/or a shorter path.

At the operation 1004, the entity-sponsored assurance of the transmission characteristic may be provided, the transmission characteristic including a higher transmission speed of the anti-viral agent on the at least one bypass network relative to transmission of the virus on the communications network. For example, the sponsoring entity 140a may provide assurance to the distributing entity 140b that the entity-sponsored bypass network(s) 402 will provide a higher transmission speed of the anti-viral agent 112 than will be experienced by the virus 108 on the communications network 102.

At the operation 1006, the entity-sponsored assurance of the transmission characteristic may be provided, the transmission characteristic including a higher quality of service of transmission of the anti-viral agent on the at least one bypass network relative to transmission of the virus on the communications network. For example, the sponsoring entity 140a may provide assurance to the distributing entity 140b that the entity-sponsored bypass network(s) 402 will provide a higher quality of service than is experienced by data on the communications network 102, e.g., in accordance with a SLA or other agreement.

At the operation 1008, the entity-sponsored assurance of the transmission characteristic may be provided, the transmission characteristic including a higher security transmission of the anti-viral agent on the at least one bypass network relative to transmission of the virus on the communications network. For example, the sponsoring entity 140a may provide assurance to the distributing entity 140b that the entity-sponsored bypass network(s) 402 will provide a higher data encryption level than is available on the communications network 102.

At the operation 1010, the entity-sponsored assurance of the transmission characteristic may be provided, the transmission characteristic including a higher transmission reliability of the anti-viral agent on the at least one bypass network relative to transmission of the virus on the communications network. For example, the sponsoring entity 140a may provide assurance to the distributing entity 140b that the entity-sponsored bypass network(s) 402 will provide the higher transmission reliability than is available to the virus 108 on the communications network 102. By using an effectively higher reliability and/or security, the entity-sponsored bypass network(s) 402 may increase the probability or expectation that the anti-viral agent 112 may be delivered to the communications network 102 in a way that is effective in stopping or otherwise limiting the spread of the virus 108.

At the operation 1012, the entity-sponsored assurance of the transmission characteristic may be provided, the transmission characteristic including a faster point-to-point delivery time of the anti-viral agent on the at least one bypass network relative to transmission of the virus on the communications network. For example, as described herein, the logical bypass network 104 may include some or all of the same physical devices of the communications network 102, but may be logically connected in different ways. Thus, the communications network 102 may transmit the virus 108 from a first network device to a second network device in a certain number of seconds, while the logical bypass network 104 may transmit the anti-viral agent 112 from the first network device to the second network device in some lesser amount of time. Consequently, for example, the sponsoring entity 140a may provide assurance to the distributing entity 140b that the entity-sponsored bypass network(s) 402 will provide a desired point-to-point delivery time for transmission of the anti-viral agent 112, e.g., using the distribution logic 416.

Figure 11:
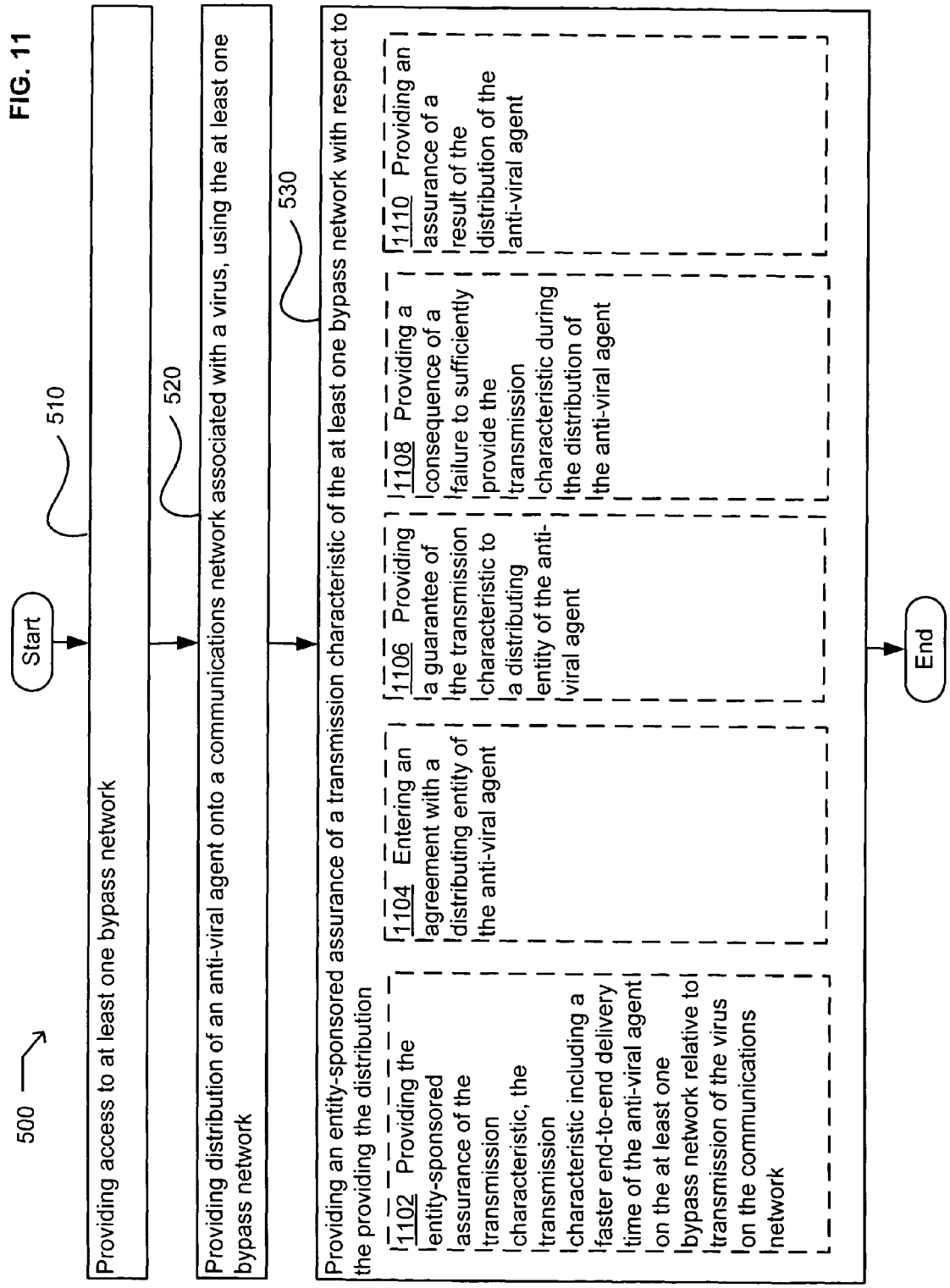
FIG. 11 illustrates an alternative embodiment of the example operational flow of FIG. 5.

FIG. 11 illustrates alternative embodiments of the example operational flow 500 of FIG. 5. FIG. 11 illustrates example embodiments where the providing operation 530 may include at least one additional operation. Additional operations may include an operation 1102, an operation 1104, an operation 1106, an operation 1108, and/or an operation 1110.

At the operation 1102, the entity-sponsored assurance of the transmission characteristic may be provided, the transmission characteristic including a faster end-to-end delivery time of the anti-viral agent on the at least one bypass network relative to transmission of the virus on the communications network. For example, there may be a network path between the infected network device 116 and the non-infected network device 118, and the logical bypass network 104 may be configured to transmit the anti-viral agent 112 from the infected network device 116 to the non-infected network device 118 in a lesser amount of time than the communications network 102, where the network path may include the end-to-end transmission therebetween, and the end-to-end transmission may include a plurality of point-to-point transmissions between particular, connected devices of the communications network 102. Thus, for example, the sponsoring entity 140a may provide assurance to the distributing entity 140b that the entity-sponsored bypass network(s) 402 will provide a desired end-to-end delivery time, e.g., using the distribution logic 416.

At the operation 1104, an agreement with a distributing entity of the anti-viral agent may be entered. For example, the sponsoring entity 140a may enter an agreement (e.g., a SLA) with the distributing entity 140b regarding access to the entity-sponsored bypass network(s) 402 and/or distribution of the anti-viral agent 112 thereon.

At the operation 1106, a guarantee of the transmission characteristic may be provided to a distributing entity of the anti-viral agent. For example, the sponsoring entity 140a may provide a guarantee to the distributing entity 140b of the transmission characteristic, e.g., in accordance with an agreement therewith.

At the operation 1108, a consequence of a failure to sufficiently provide the transmission characteristic during the distribution of the anti-viral agent may be provided. For example, the sponsoring entity 140a may agree to a consequence for failing to provide the transmission characteristic in the assured manner. For example, where the sponsoring entity 140a provides assurance of a certain transmission speed on the entity-sponsored bypass network(s) 402, and the transmission speed is not provided, then the sponsoring entity may provide a refund to the distributing entity 140b, or may provide free or discounted future access to the entity-sponsored bypass network(s) 402.

At the operation 1110, an assurance of a result of the distribution of the anti-viral agent may be provided. For example, the sponsoring entity 140a may provide assurance to the distributing entity 140b that a certain result in distributing the anti-viral agent 112 will be achieved. For example, such a result may include a percentage or number of devices of the communications network 102 that are immunized, perhaps within a certain time frame or having a certain (maximum) amount of infection of the communications network 102 or individual devices thereof.

Figure 12:
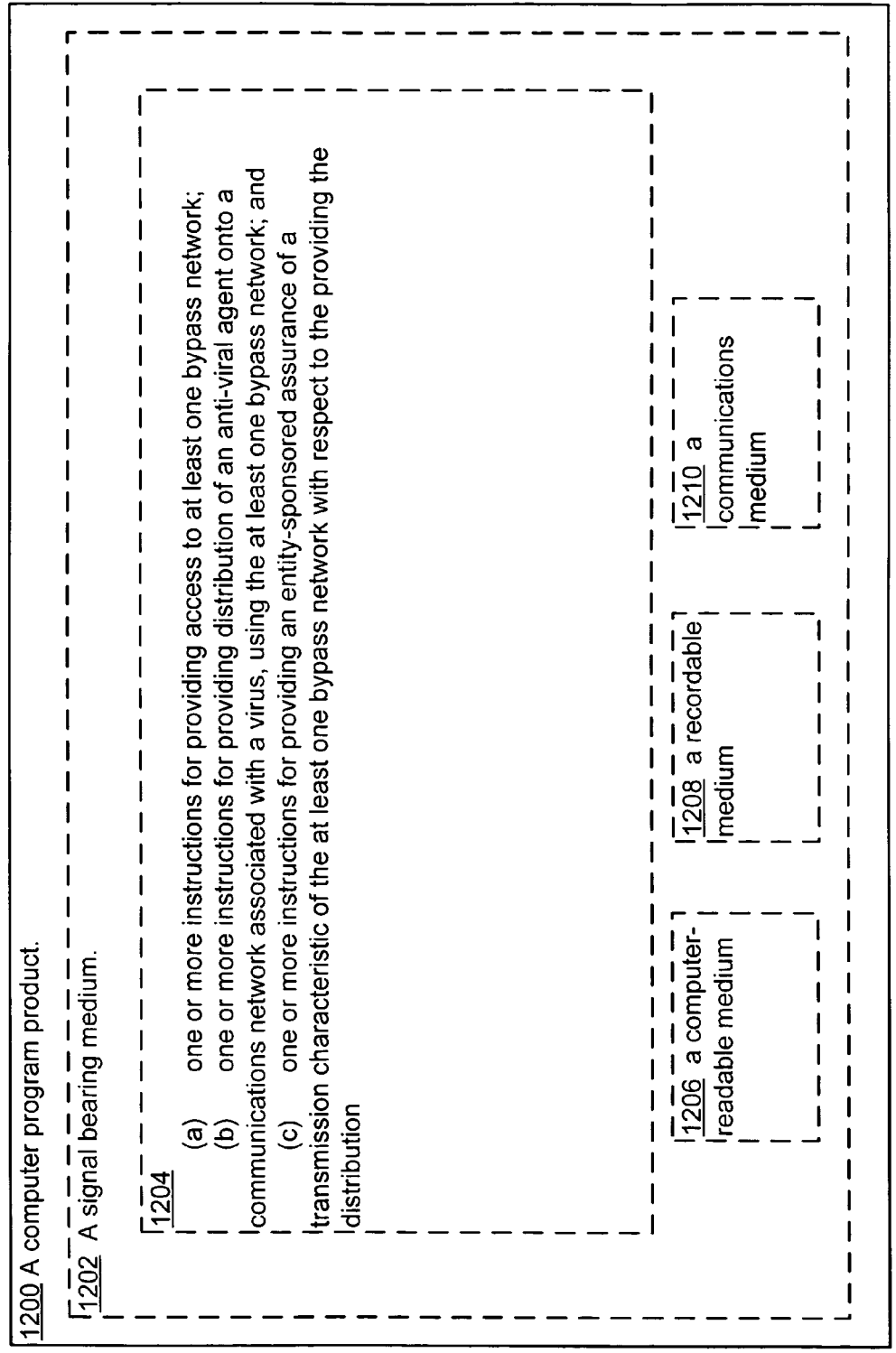
FIG. 12 is a partial view of an example computer program product that includes a computer program for executing a computer process on a computing device.

FIG. 12 illustrates a partial view of an example computer program product 1200 that includes a computer program 1204 for executing a computer process on a computing device. An embodiment of the example computer program product 1200 is provided using a signal bearing medium

1202, and may include at least one or more instructions 1204 for providing access to at least one bypass network, and the signal bearing medium 1202 also bearing one or more instructions for providing distribution of an anti-viral agent onto a communications network associated with a virus, using the at least one bypass network, and the signal bearing medium 1202 also bearing one or more instructions for providing an entity-sponsored assurance of a transmission characteristic of the at least one bypass network with respect to the providing the distribution.

The one or more instructions may be, for example, computer executable and/or logic-implemented instructions. In one implementation, the signal-bearing medium 1202 may include a computer-readable medium 1206. In one implementation, the signal bearing medium 1202 may include a recordable medium 1208. In one implementation, the signal bearing medium 1202 may include a communications medium 1210.

Figure 13:
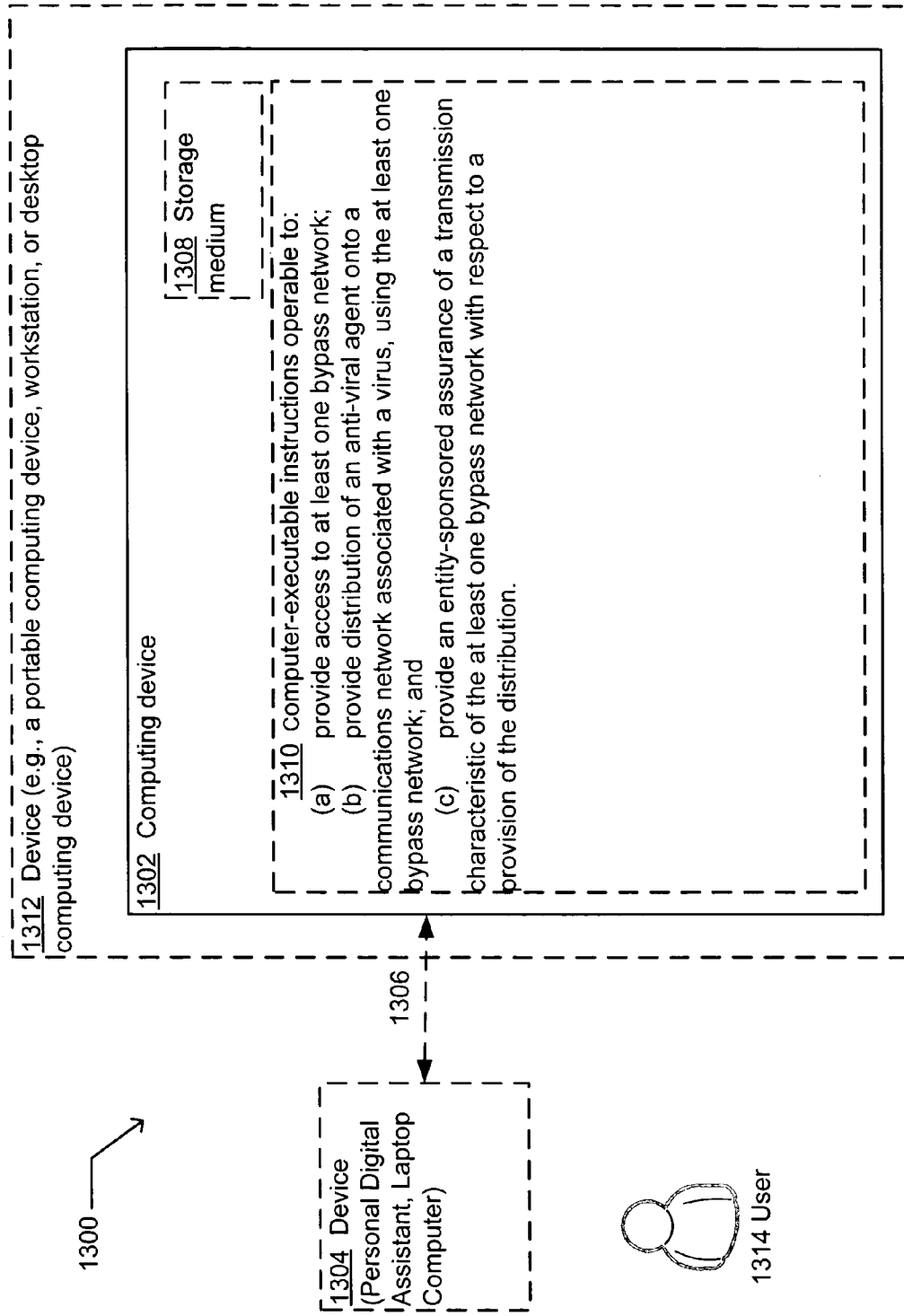
FIG. 13 illustrates an example system in which embodiments may be implemented.

FIG. 13 illustrates an example system 1300 in which embodiments may be implemented. The system 1300 includes a computing system environment. The system 1300 also illustrates the user 1314 using a device 1304, which is optionally shown as being in communication with a computing device 1302 by way of an optional coupling 1306. The optional coupling 1306 may represent a local, wide-area, or peer-to-peer network, or may represent a bus that is internal to a computing device (e.g., in example embodiments in which the computing device 1302 is contained in whole or in part within the device 1304). A storage medium 1308 may include virtually any computer storage media.

The computing device 1302 includes computer-executable instructions 1310 that when executed on the computing device 1302 cause the computing device 1302 to provide access to at least one bypass network, provide distribution of an anti-viral agent onto a communications network associated with a virus, using the at least one bypass network, and provide an entity-sponsored assurance of a transmission characteristic of the at least one bypass network with respect to a provision of the distribution.

In FIG. 13, then, the system 1300 includes at least one computing device (e.g., 1302, 1304, and/or 1312). The computer-executable instructions 1310 may be executed on one or more of the at least one computing device. For example, the computing device 1302 may implement the computer-executable instructions 1310 and output a result to (and/or receive data from) the computing device 1304. Since the computing device 1302 may be wholly or partially contained within the device 1312, the device 1312 also may be said to execute some or all of the computer-executable instructions 1310, in order to be caused to perform or implement, for example, various ones of the techniques described herein, or other techniques.

In addition, those skilled in the art will understand that computer-executable instructions 1310 may further include one or more instructions sufficient to perform one or more of the operations illustrated and/or described in relation to one or more of FIG. 5 through FIG. 11, but that such operations are not shown expressly herein for sake of brevity.

The device 1304 may include, for example, one or more of a server, a personal digital assistant (PDA) or cell phone, a laptop computer, a tablet personal computer, a networked computer, a computing system comprised of a cluster of processors, a workstation computer, and/or a desktop computer. In another example embodiment, the device 1304 may be operable to provide the anti-viral agent to the communications network 102 and prevent, reduce, or inhibit propagation of the virus 108 thereon.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method comprising:
   providing access to at least one bypass network;
   providing distribution of an anti-viral agent onto a communications network associated with a virus, using the at least one bypass network which comprises devices not included in the communications network;
   providing an entity-sponsored assurance of a transmission characteristic of the at least one bypass network with respect to the providing the distribution; and
   allowing a distributing entity of the anti-viral agent to manage resources of the at least one bypass network.

2. The method of claim 1 wherein providing access to at least one bypass network comprises:

providing access to the at least one bypass network, based on a service level agreement with a distributing entity of the anti-viral agent to whom the access is provided.

3. The method of claim 1 wherein providing access to at least one bypass network comprises:

providing fee-based access to the at least one bypass network.

4. The method of claim 1 wherein providing access to at least one bypass network comprises:

providing access to the at least one bypass network, the at least one bypass network including at least two bypass networks having entity-sponsored assurance of transmission therebetween.

5. The method of claim 1 wherein providing distribution of an anti-viral agent onto a communications network associated with a virus, using the at least one bypass network, comprises:

providing prioritized routing of the anti-viral agent, relative to communications data of the communications network.

6. The method of claim 1 wherein providing an entity-sponsored assurance of a transmission characteristic of the at least one bypass network with respect to the providing the distribution comprises:

providing the entity-sponsored assurance of the transmission characteristic, the transmission characteristic including a lower transmission latency of the anti-viral agent on the at least one bypass network relative to transmission of the virus on the communications network.

7. The method of claim 1 wherein providing an entity-sponsored assurance of a transmission characteristic of the at least one bypass network with respect to the providing the distribution comprises:

providing the entity-sponsored assurance of the transmission characteristic, the transmission characteristic including a higher transmission speed of the anti-viral agent on the at least one bypass network relative to transmission of the virus on the communications network.

8. The method of claim 1 wherein providing an entity-sponsored assurance of a transmission characteristic of the at least one bypass network with respect to the providing the distribution comprises:

providing the entity-sponsored assurance of the transmission characteristic, the transmission characteristic including a higher quality of service of transmission of the anti-viral agent on the at least one bypass network relative to transmission of the virus on the communications network.

9. The method of claim 1 wherein providing an entity-sponsored assurance of a transmission characteristic of the at least one bypass network with respect to the providing the distribution comprises:

providing the entity-sponsored assurance of the transmission characteristic, the transmission characteristic including a higher security transmission of the anti-viral agent on the at least one bypass network relative to transmission of the virus on the communications network.

10. The method of claim 1 wherein providing an entity-sponsored assurance of a transmission characteristic of the at least one bypass network with respect to the providing the distribution comprises:

providing the entity-sponsored assurance of the transmission characteristic, the transmission characteristic including a higher transmission reliability of the anti-viral agent on the at least one bypass network relative to transmission of the virus on the communications network.

11. The method of claim 1 wherein providing an entity-sponsored assurance of a transmission characteristic of the at least one bypass network with respect to the providing the distribution comprises:

providing the entity-sponsored assurance of the transmission characteristic, the transmission characteristic including a faster point-to-point delivery time of the anti-viral agent on the at least one bypass network relative to transmission of the virus on the communications network.

12. The method of claim 1 wherein providing an entity-sponsored assurance of a transmission characteristic of the at least one bypass network with respect to the providing the distribution comprises:

providing the entity-sponsored assurance of the transmission characteristic, the transmission characteristic including a faster end-to-end delivery time of the anti-viral agent on the at least one bypass network relative to transmission of the virus on the communications network.

13. The method of claim 1 wherein providing an entity-sponsored assurance of a transmission characteristic of the at least one bypass network with respect to the providing the distribution comprises:

entering an agreement with a distributing entity of the anti-viral agent.

14. The method of claim 1 wherein providing an entity-sponsored assurance of a transmission characteristic of the at least one bypass network with respect to the providing the distribution comprises:

providing a guarantee of the transmission characteristic to a distributing entity of the anti-viral agent.

15. The method of claim 1 wherein providing an entity-sponsored assurance of a transmission characteristic of the at least one bypass network with respect to the providing the distribution comprises:

providing a consequence of a failure to sufficiently provide the transmission characteristic during the distribution of the anti-viral agent.

16. The method of claim 1 wherein providing an entity-sponsored assurance of a transmission characteristic of the at least one bypass network with respect to the providing the distribution comprises:

providing an assurance of a result of the distribution of the anti-viral agent.

17. A computer program product comprising:
a non-transitory signal-bearing medium bearing:
(a) one or more instructions for providing access to at least one bypass network;
(b) one or more instructions for providing distribution of an anti-viral agent onto a communications network associated with a virus, using the at least one bypass network which comprises devices not included in the communications network;
(c) one or more instructions for providing an entity-sponsored assurance of a transmission characteristic of the at least one bypass network with respect to the providing the distribution; and
(d) allowing a distributing entity of the anti-viral agent to manage resources of the at least one bypass network.

18. A system comprising:
means including hardware for providing access to at least one bypass network;
means including hardware for providing distribution of an anti-viral agent onto a communications network associated with a virus, using the at least one bypass network which comprises devices not included in the communications network;
means including hardware for providing an entity-sponsored assurance of a transmission characteristic of the at least one bypass network with respect to the providing the distribution; and
means including hardware for allowing a distributing entity of the anti-viral agent to manage resources of the at least one bypass network.

19. The system of claim 18, wherein the means for providing access to at least one bypass network comprises:
means for providing access to the at least one bypass network, based on a service level agreement with a distributing entity of the anti-viral agent to whom the access is provided.

20. The system of claim 18, wherein the means for providing access to at least one bypass network comprises:
means for obtaining authorization and/or authentication information for the access; and
means for providing the access based on the authorization and/or authentication.

21. The system of claim 18, wherein the means for providing access to at least one bypass network comprises:
means for providing fee-based access to the at least one bypass network.

22. The system of claim 18, wherein the means for providing access to at least one bypass network comprises:
means for providing access to the at least one bypass network to a virus detection service.

23. The system of claim 15, wherein the means for providing access to at least one bypass network comprises:
means for providing access to the at least one bypass network, the at least one bypass network being at least partially logically separate from the communications network.

24. The system of claim 18, wherein the means for providing access to at least one bypass network comprises:
means for providing access to the at least one bypass network, the at least one bypass network including a managed network.

25. The system of claim 18, wherein the means for providing access to at least one bypass network comprises:
means for providing access to the at least one bypass network, the at least one bypass network including at least two bypass networks having entity-sponsored assurance of transmission therebetween.

26. The system of claim 18, wherein the means for providing distribution of an anti-viral agent onto a communications network associated with a virus, using the at least one bypass network, comprises:
means for allowing a distributing entity of the anti-viral agent to distribute the anti-viral agent based on response rules of the distributing entity.

27. The system of claim 18, wherein the means for providing distribution of an anti-viral agent onto a communications network associated with a virus, using the at least one bypass network, comprises:
means for providing the distribution of the anti-viral agent based on distribution logic of a sponsoring entity providing the entity-sponsored assurance.

28. The system of claim 18, wherein the means for providing distribution of an anti-viral agent onto a communications network associated with a virus, using the at least one bypass network, comprises:
means for providing distribution of an anti-viral agent onto a communications network associated with the virus, the virus being transmitted on the communications network.

29. The system of claim 18, wherein the means for providing distribution of an anti-viral agent onto a communications network associated with a virus, using the at least one bypass network, comprises:
means for providing distribution of the anti-viral agent to a network device of the communications network in advance of an infection of the network device by the virus, using the at least one bypass network.

30. The system of claim 18, wherein the means for providing distribution of an anti-viral agent onto a communications network associated with a virus, using the at least one bypass network, comprises:
means for providing distribution of the anti-viral agent onto the communications network using the at least one bypass network, using a network traffic management device that is operable to implement rules governing the distributing of the anti-viral agent onto the communications network.

31. The system of claim 18, wherein the means for providing distribution of an anti-viral agent onto a communications network associated with a virus, using the at least one bypass network, comprises:
means for providing prioritized routing of the anti-viral agent, relative to communications data of the communications network.

32. The system of claim 18, wherein the means for providing an entity-sponsored assurance of a transmission characteristic of the at least one bypass network with respect to the providing the distribution comprises:
means for providing the entity-sponsored assurance of the transmission characteristic, the transmission characteristic including a lower transmission latency of the anti-viral agent on the at least one bypass network relative to transmission of the virus on the communications network.

33. The system of claim 18, wherein the means for providing an entity-sponsored assurance of a transmission characteristic of the at least one bypass network with respect to the providing the distribution comprises:
means for providing the entity-sponsored assurance of the transmission characteristic, the transmission characteristic including a higher transmission speed of the anti-viral agent on the at least one bypass network relative to transmission of the virus on the communications network.

34. The system of claim 18, wherein the means for providing an entity-sponsored assurance of a transmission characteristic of the at least one bypass network with respect to the providing the distribution comprises:
  means for providing the entity-sponsored assurance of the transmission characteristic, the transmission characteristic including a higher quality of service of transmission of the anti-viral agent on the at least one bypass network relative to transmission of the virus on the communications network.

35. The system of claim 18, wherein the means for providing an entity-sponsored assurance of a transmission characteristic of the at least one bypass network with respect to the providing the distribution comprises:

means for providing the entity-sponsored assurance of the transmission characteristic, the transmission characteristic including a higher security transmission of the anti-viral agent on the at least one bypass network relative to transmission of the virus on the communications network.

36. The system of claim 18, wherein the means for providing an entity-sponsored assurance of a transmission characteristic of the at least one bypass network with respect to the providing the distribution comprises:

means for providing the entity-sponsored assurance of the transmission characteristic, the transmission characteristic including a higher transmission reliability of the anti-viral agent on the at least one bypass network relative to transmission of the virus on the communications network.

37. The system of claim 18, wherein the means for providing an entity-sponsored assurance of a transmission characteristic of the at least one bypass network with respect to the providing the distribution comprises:

means for providing the entity-sponsored assurance of the transmission characteristic, the transmission characteristic including a faster point-to-point delivery time of the anti-viral agent on the at least one bypass network relative to transmission of the virus on the communications network.

38. The system of claim 18, wherein the means for providing an entity-sponsored assurance of a transmission characteristic of the at least one bypass network with respect to the providing the distribution comprises:

means for providing the entity-sponsored assurance of the transmission characteristic, the transmission characteristic including a faster end-to-end delivery time of the anti-viral agent on the at least one bypass network relative to transmission of the virus on the communications network.

39. The system of claim 18, wherein the means for providing an entity-sponsored assurance of a transmission characteristic of the at least one bypass network with respect to the providing the distribution comprises:

means for entering an agreement with a distributing entity of the anti-viral agent.

40. The system of claim 18, wherein the means for providing an entity-sponsored assurance of a transmission characteristic of the at least one bypass network with respect to the providing the distribution comprises:

means for providing a guarantee of the transmission characteristic to a distributing entity of the anti-viral agent.

41. The system of claim 18, wherein the means for providing an entity-sponsored assurance of a transmission characteristic of the at least one bypass network with respect to the providing the distribution comprises:

means for providing a consequence of a failure to sufficiently provide the transmission characteristic during the distribution of the anti-viral agent.

42. The system of claim 18, wherein the means for providing an entity-sponsored assurance of a transmission characteristic of the at least one bypass network with respect to the providing the distribution comprises:

means for providing an assurance of a result of the distribution of the anti-viral agent.

43. The system of claim 18, further comprising:

a computing device including at least one of a server, a personal digital assistant (PDA), a cell phone, a laptop computer, a tablet personal computer, a networked computer, a computing system comprised of a cluster of processors, a workstation computer, and/or a desktop computer; and said computing device operably coupled with at least one of said means for providing access to at least one bypass network, said means for providing distribution of an anti-viral agent onto a communications network associated with a virus, using the at least one bypass network, and/or said means for providing an entity-sponsored assurance of a transmission characteristic of the at least one bypass network with respect to the providing the distribution.

44. The system of claim 18, further comprising:

a computing device operable to provide the anti-viral agent to the communications network and prevent, reduce, or inhibit propagation of the virus thereon, using the at least one bypass network; and said computing device operably coupled with at least one of said means for providing access to at least one bypass network, said means for providing distribution of an anti-viral agent onto a communications network associated with a virus, using the at least one bypass network, and/or said means for providing an entity-sponsored assurance of a transmission characteristic of the at least one bypass network with respect to the providing the distribution.

* * * * *

UNITED STATES PATENT AND TRADEMARK OFFICE
CERTIFICATE OF CORRECTION

| | | |
|---|---|---|
| PATENT NO. | : 7,934,260 B2 | Page 1 of 1 |
| APPLICATION NO. | : 11/513901 | |
| DATED | : April 26, 2011 | |
| INVENTOR(S) | : Jung et al. | |

It is certified that error appears in the above-identified patent and that said Letters Patent is hereby corrected as shown below:

At column 27, line 51, please amend the preamble of claim 23 as follows:

please replace "15" with --18--.

Signed and Sealed this
Twentieth Day of March, 2012

David J. Kappos
*Director of the United States Patent and Trademark Office*